US011606683B2

(12) United States Patent
Sharma et al.

(10) Patent No.: US 11,606,683 B2
(45) Date of Patent: Mar. 14, 2023

(54) FIRST NODE, SECOND NODE, THIRD NODE AND METHODS PERFORMED THEREBY FOR HANDLING ROAMING INFORMATION

(71) Applicant: Telefonaktiebolaget LM Ericsson (publ), Stockholm (SE)

(72) Inventors: Nipun Sharma, New Delhi (IN); Rohit Shukla, Noida (IN); Tushar Sabharwal, New Delhi (IN); Hans Eriksson, Sollentuna (SE); Virgilio Fiorese, McKinney, TX (US); Venkata Sameer Kumar Kodukula, Noida (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 17/293,600

(22) PCT Filed: Dec. 5, 2018

(86) PCT No.: PCT/EP2018/083663
§ 371 (c)(1),
(2) Date: May 13, 2021

(87) PCT Pub. No.: WO2020/114592
PCT Pub. Date: Jun. 11, 2020

(65) Prior Publication Data
US 2022/0022026 A1    Jan. 20, 2022

(51) Int. Cl.
*H04W 36/00*    (2009.01)
*H04W 8/12*    (2009.01)

(52) U.S. Cl.
CPC ..................... *H04W 8/12* (2013.01)

(58) Field of Classification Search
CPC ............... H04W 8/12; H04W 36/00
See application file for complete search history.

(56) References Cited

U.S. PATENT DOCUMENTS

2009/0061854 A1    3/2009  Gillot et al.
2011/0217978 A1*   9/2011  Horn ............... H04W 8/186
                                                  455/433

(Continued)

FOREIGN PATENT DOCUMENTS

CN     108738027 A      11/2018
EP       3270617 A1      1/2018

(Continued)

OTHER PUBLICATIONS

International Search Report and Written Opinion of the International Searching Authority for PCT International Application No. PCT/EP2018/083663 dated Sep. 23, 2019.

*Primary Examiner* — Michael T Vu
(74) *Attorney, Agent, or Firm* — Sage Patent Group

(57) ABSTRACT

A method, performed by a first node is described, the method being for handling roaming information. The first node operates in a first communications network. The first node determines a set of network resources predicted to be required by a group of subscribers while roaming in a second communications network. The first node then initiates providing an indication of the determined set of resources to a second node in the second communications network. The second node receives the indication and determines whether or not an allocation of the set of resources meets a criterion. The second node then initiates performing an operation based on the determination. A third node determines data regarding a roaming behavior of the group of subscribers and provides information based on the determined data, to the first node.

8 Claims, 11 Drawing Sheets

(56) References Cited

U.S. PATENT DOCUMENTS

| | | | |
|---|---|---|---|
| 2013/0122900 A1 | 5/2013 | Peterson et al. | |
| 2013/0237184 A1 | 9/2013 | Cattan | |
| 2017/0332226 A1 | 11/2017 | Bharatia | |
| 2020/0260345 A1* | 8/2020 | Phuyal | H04W 36/0079 |
| 2022/0264275 A1* | 8/2022 | Vamanan | H04W 4/90 |

FOREIGN PATENT DOCUMENTS

| | | |
|---|---|---|
| WO | 2015130203 A1 | 9/2015 |
| WO | 2017113100 A1 | 7/2017 |
| WO | 2017144096 A1 | 8/2017 |

* cited by examiner a)

b)

a)

b)

FIRST NODE, SECOND NODE, THIRD NODE AND METHODS PERFORMED THEREBY FOR HANDLING ROAMING INFORMATION

TECHNICAL FIELD

The present disclosure relates generally to a first node and methods performed thereby for handling roaming information. The present disclosure also relates generally to a second node, and methods performed thereby for handling roaming information. The present disclosure further relates generally to a third node and methods performed thereby for handling roaming information. The present disclosure further relates generally to computer program products, comprising instructions to carry out the actions described herein, as performed by, respectively, the first node, the second node or the third node. The computer program products may be stored on a computer-readable storage mediums.

BACKGROUND

Nodes within a telecommunications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The telecommunications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as wireless devices, with serving beams.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation (NG) Core Network, abbreviated as NG-CN, NGC or 5G CN.

Currently, in the 5G architecture, the concept of network slicing has been introduced, which may be understood as "a set of network functions, and resources to run these network functions, forming a complete instantiated logical network to meet certain network characteristics required by the Service Instance(s)." An instantiated logical network may be understood as a dedicated set of instantiated network resources, software and hardware, that may be understood to form a complete network configuration isolated from other logical network instances, for a set of user terminals authorized to be connected to the logical network instance, that is, a network slice instance.

Network slicing may be understood to primarily comprise the following components: physical resource, logical resource, and network function.

Physical resource may be understood as a physical asset capable of performing computation, storage or transport including radio access. Logical resource may be understood as a partition of a physical resource, or grouping of multiple physical resources dedicated to a Network Function or shared between a set of Network Functions. A Network Function (NF) may be understood to refer to processing functions executing a dedicated task in a network. This may include, but is not limited to, telecom nodes functionality, as well as switching functions e.g., Ethernet switching function, and Internet Protocol (IP) routing functions. A Virtual Network Function (VNF) may be understood as a virtualized version of a NF. Further details on VNF may be found in the European Telecommunication Standards Institute (ETSI) NFV. Network Functions are not regarded as resources.

A Network slice may be defined within a Public Land Mobile Network (PLMN) and may be understood to include a Core Network Control Plane and User Plane Network Functions, and, in the serving PLMN, at least one of the following: the NG Radio Access Network and the N3IWF functions to the non-3GPP Access Network.

In the home network, the PLMN Operator may manage and orchestrate the Network Slicing operations for the 5G subscribers. These slicing operations may include design, instantiate, operate and decommission Network Slices for the 5G subscribers. The slice selection mechanism may be based on PLMN, Access Point Name (APN), UE Usage type, Single Network Slice Selection Assistance Information (S-NSSAI) etc.

However, for the 5G roaming subscribers, there may be two primary mechanisms for the Control Plane signalling: home routed and local breakout.

In the home routed mechanism, the roaming subscriber user plane data plane information may be routed back to the HPLMN, which may be controlled and administered by home operator. This mechanism comes with the drawback of considerable latency and Service Level Agreement (SLA) issues.

In the local breakout mechanism, the visited operator may be understood to have the control and mechanism of the roaming subscribers signalling. This mechanism has a limitation which may be understood to be that the home network gets no control of the service and it becomes hard to make it consistent across the networks.

To overcome the limitations of the above signalling mechanism of the 5G roaming subscribers, the concept of Federated slicing has been introduced. The high-level concept of federated slicing is that the home service providing operator may set up a part or subnet of the network slice using infrastructure provided by the roaming partner operators to extend the home operator services into the areas served by roaming partner operators. For example, this may be understood as replicating the Home PLMN HPLMN Packet Data Network Gateway (P-GW) functionality on Visited PLMN (VPLMN) infrastructure Under certain circumstances, however, the federated slices may still be unable to provide roaming subscribers with the network slice resources that they may require, leading to disruption in communication services.

SUMMARY

It is an object of embodiments herein to improve the handling of roaming information in a communications network.

According to a first aspect of embodiments herein, the object is achieved by a method, performed by a first node. The method is for handling roaming information. The first node operates in a first communications network. The first node determines a set of network resources predicted to be required by a group of subscribers of the first communications network while roaming in a second communications network. The first node also initiates providing a first indication of the determined set of network resources to a second node operating in the second communications network.

According to a second aspect of embodiments herein, the object is achieved by a method, performed by the second node. The method is for handling roaming information. The second node operates in the second communications network. The second node receives, from the first node operating in the first communications network, the first indication of the set of network resources predicted to be required by the group of subscribers of the first communications network while roaming in the second communications network. The second determines whether or not the allocation of the set of network resources for use by the group of subscribers meets an allocation criterion. The second node initiates performing an operation based on a result of the determination. The operation is selected out of: a) allocating the set of network resources for use by the group of subscribers with the proviso the that criterion is met, and b) sending a second indication to the first node, with the proviso the that criterion is not met. The second indication indicates that the second node is to refrain from allocating the set of network resources.

According to a third aspect of embodiments herein, the object is achieved by a method, performed by the third node. The method is for handling roaming information. The third node operates in one of: the first communications network, and the second communications network. The third node determines data regarding the roaming behavior of the group of subscribers of the first communications network. The data comprises at least one of: a) first historical data on a roaming pattern in the second communications network of the group of subscribers during a first time period, b) second historical data on a pattern of outgoing calls, by the group of subscribers, to the second communications network, c) current data on the users of the first communications network roaming in the second communications network, the data being on intended future use of the second communications network during a second time period, d) first data from Uniform Locators visited by the group of subscribers, e) second data from Over the Top service providers used by the group of subscribers, and f) third data on roaming plans activated by the group of subscribers. The third node provides information based on the determined data, to the first node operating in the first communications network.

According to a fourth aspect of embodiments herein, the object is achieved by the first node, configured to operate in the first communications network. The first node is further configured to determine the set of network resources predicted to be required by the group of subscribers of the first communications network while roaming in the second communications network. The first node is also configured to initiate providing the first indication of the set of network resources configured to be determined to the second node configured to operate in the second communications network.

According to a fifth aspect of embodiments herein, the object is achieved by the second node, configured to handle roaming information. The second node is configured to operate in the second communications network. The second node is further configured to receive, from the first node configured to operate in the first communications network, the first indication of the set of network resources predicted to be required by the group of subscribers of the first communications network while roaming in the second communications network. The second node is also configured to determine whether or not the allocation of the set of network resources for use by the group of subscribers meets the allocation criterion. The second node is further configured to initiate performing the operation based on the result of the determination. The operation is configured to be selected out of: a) allocating the set of network resources for use by the group of subscribers with the proviso the that criterion is met, and b) sending the second indication to the first node, with the proviso the that criterion is not met. The second indication is configured to indicate that the second node is to refrain from allocating the set of network resources.

According to a sixth aspect of embodiments herein, the object is achieved by the third node, configured to handle roaming information. The third node is configured to operate in one of: the first communications network, and the second communications network. The third node is further configured to determine the data regarding the roaming behavior of the group of subscribers of the first communications network. The data comprises at least one of: a) the first historical data on the roaming pattern in the second communications network of the group of subscribers during the first time period, b) the second historical data on the pattern of outgoing calls, by the group of subscribers, to the second communications network, c) the current data on the users of the first communications network configured to be roaming in the second communications network, the data being configured to be on the intended future use of the second communications network during the second time period, d) the first data from the Uniform Locators configured to be visited by the group of subscribers, e) the second data from the Over the Top service providers configured to be used by the group of subscribers, and f) the third data on roaming plans configured to be activated by the group of subscribers. The third node is further configured to provide the information based on the data configured to be determined, to the first node configured to be operate in the first communications network.

According to a seventh aspect of embodiments herein, the object is achieved by a computer program, comprising instructions which, when executed on at least one processor, cause the at least one processor to carry out the method performed by the first node.

According to an eighth aspect of embodiments herein, the object is achieved by a computer-readable storage medium, having stored thereon the computer program, comprising instructions which, when executed on at least one processor, cause the at least one processor to carry out the method performed by the first node.

According to a ninth aspect of embodiments herein, the object is achieved by a computer program, comprising instructions which, when executed on at least one processor, cause the at least one processor to carry out the method performed by the second node.

According to a tenth aspect of embodiments herein, the object is achieved by a computer-readable storage medium, having stored thereon the computer program, comprising instructions which, when executed on at least one processor, cause the at least one processor to carry out the method performed by the second node.

According to an eleventh aspect of embodiments herein, the object is achieved by a computer program, comprising instructions which, when executed on at least one processor, cause the at least one processor to carry out the method performed by the third node.

According to a twelfth aspect of embodiments herein, the object is achieved by a computer-readable storage medium, having stored thereon the computer program, comprising instructions which, when executed on at least one processor, cause the at least one processor to carry out the method performed by the third node.

By the first node determining the set of network resources predicted to be required by the group of subscribers while roaming in the second communications network, it is then enabled to initiate providing the first indication of the determined set of network resources to the second node operating in the second communications network. The first node may enable the second node to determine whether or not the allocation of the set of network resources meets the allocation criterion, and initiating performing the operation accordingly. The first node may therefore ensure that continued service is provided to the group of subscribers while roaming in the second communications network, in accordance with a certain service agreement. Therefore, allocation of resources in the second communications network may be planned ahead of time, enabling that service disruptions are decreased or prevented, latency is decreased, and energy, e.g., battery consumption in the devices of the group of subscribers is saved. Therefore, the performance of the first communications network and the second communications network is improved.

BRIEF DESCRIPTION OF THE DRAWINGS

Examples of embodiments herein are described in more detail with reference to the accompanying drawings, according to the following description.

DETAILED DESCRIPTION

Figure 1:
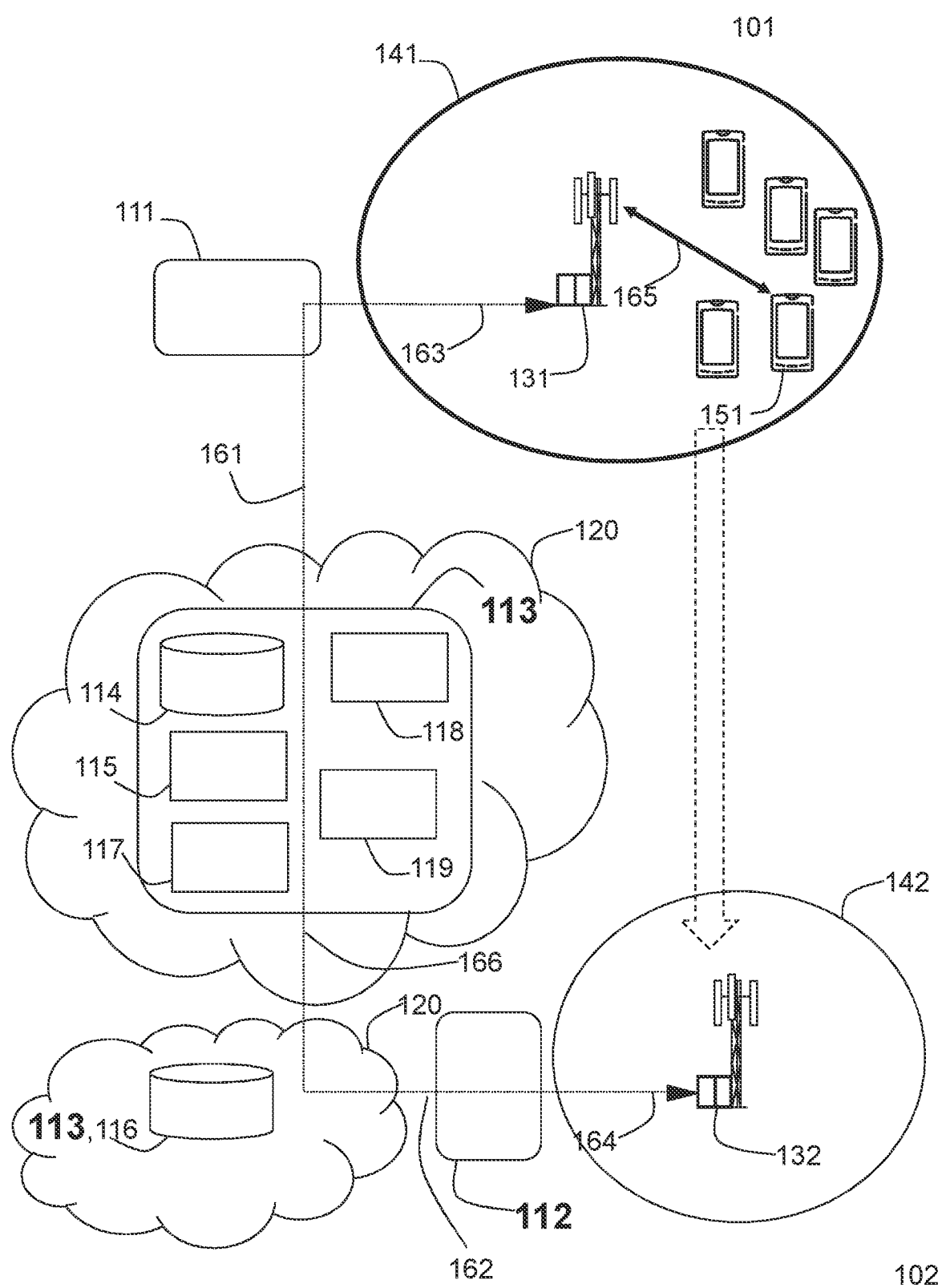
FIG. 1 is a schematic diagram illustrating a non-limiting example of a first communications network and a second communications network, according to embodiments herein.

As part of the development of embodiments herein, a problem with exiting methods will first be identified and discussed.

With the introduction of the federated slicing concept, the HPLMN home operator may be understood to own the responsibility to manage the network slice instance executing on the network infrastructure resources provided by the VPLMN roaming operator. Ideally speaking, VPLMN may be understood to only be required to provide the infrastructure, Virtual Machines (VMs), etc. . . . as per network slice dimension requested by the HPLMN. This specification of the slicing parameters of the federated slice for the HPLMN is to serve the roaming subscribers with an agreed set of network functions and quality of service.

In current systems, the network and compute resources that may be necessary to meet requirements derived from for the slicing parameters of the federated slice for the HPLMN to serve the roaming subscribers may take a fixed default footprint of the server capacity that may be enough for a large number of roaming users. When that capacity is not enough, there may be a scale out mechanism to increase the needed resources that the VNF may consume. The increase of network and cloud resources may only be done to the level that may have been agreed to between the home and visited operators.

In existing methods, one of the ways to dimension a system or network in a simple fashion may be to have a large overprovisioning of network resources allocated, even if they may not be used all the time. This may be done to secure that enough resource may be made available during high traffic peak hours. However, this results in that extra hardware is required.

One of the expectations with choosing a cloud implemented telecommunication system, starting with ETSI NFV work, was to have a more efficient use of the common hardware resources, e.g., compute and network, compared to a vertical integrated hardware/software vendor specific nodes. However, using a certain number of virtual machines for a network function may occupy a relatively large hardware compute resources, e.g., micro cores in a CPU.

Then, in the ongoing work in 3GPP to migrate current products to future Service Based Architecture (SBA) based products, where the NF level may be removed, the migrated products are expected to have a more fine granular, and more cost effective scaling of resource consumption for network functions and/or network services. A network function may be understood as a "container" that may have a number of "network services" as defined in 3GPP. When implementing the "network Services" using a service based architecture, a micro service cluster, e.g. Kubernetes uServices may be used. In this way, the scalability may be done on uService level that may be understood to have a finer granularity than the VM network function level. A uService may only occupy a CPU "thread" in a server blade.

In existing methods, using VM allocation and one to one mapping of CPU resource" there may be more than 100% overallocation of network resources compared to average traffic load, to secure for peak traffic and guaranteed performance. To scale out may take a long time in minutes. An approach to better optimize the resource utilization may be to have a better sharing of resources in the cloud infrastructure where uService implementation may be used, where also scaling the capacity may be much faster than doing this on VM level. This may allow to have a smaller margin peak traffic when allocating resources for a uService. Several uServices may share in an easier way the same core in an CPU hardware unit. However, to still guarantee performance, this may require more knowledge and predicted traffic conditions in order to in time scale resources as needed.

In this case, there may be a higher motivation to have a more elaborated mechanism using analytics in defining the needed network slice resource requirement.

It may be understood that in the agreement between the operators of the HPLMN and the VPLMN, there may be an initial smallest resource definition of a federated network slice, as well as an agreed maximum resource allocation allowed.

Under certain circumstances, the network slice resources may need to be scaled out for higher capacity. Some examples may be global events, such as the FIFA world cup. For this event, there may be understood to be a very high number of roamers from across the globe in the VPLMN, that is, the network of an operator in the host country of the world cup. Moreover, there may be a higher than normal number of roamers in the host country of the world cup at a particular time and day, etc. . . . Therefore, the number of roamers that may have been agreed to between the HPLMN and the VPLMN may be exceeded. Another example may be the case of an emergency situation. For example, a snowstorm may be expected in country and subscribers may be asked to move to another country ahead of the snowstorm. These situation may be factored in from OTT players such as news channels, etc.

Such scaling may be understood as an area of optimization and also predictive analytics to enable the VPLMN to be ready to support the expected additional infrastructure that may be needed. In current specifications, there is no method defined on optimized or predictive analysis from the HPLMN towards the VPMLN with finer details on network slice level and that in proactively way.

According to the foregoing, the challenge for the HPLMN is to predict the required resources that may be needed for the federated slice at the VPLMN roaming operator. This is to avoid over and/or under utilization of the network slice functions and network resources based on the dynamic nature of the network or world. Currently, the home operator does not have any apparatus and/or method to provide the analysis and projection of the 5G out-roamers for a particular period, including data sources from different network operator nodes and external nodes, such as Over-The-Top (OTT), online service provider, etc.

Several embodiments are comprised herein, which address these problems of the existing methods. Embodiments herein provide for methods to perform a proactive analysis at the HPLMN to predict a probable increase and/or decrease in the traffic for roaming subscribers at the VPLMN, and, hence, the respective resources that may be needed to provide service to them. Additionally, embodiments herein may provide for methods to handle the scenario where the HPLMN may request an increase in resources for the roaming subscribers that may exceed the network slice dimension that may have been agreed to between the VPLMN and the HPLMN.

Embodiments herein may therefore be understood to be related to a method and apparatus for building intelligence for predictive analysis for federated slicing.

The embodiments will now be described more fully hereinafter with reference to the accompanying drawings, in which examples are shown. In this section, embodiments herein are illustrated by exemplary embodiments. It should be noted that these embodiments are not mutually exclusive. All possible combinations are not described to simplify the description. Components from one embodiment or example may be tacitly assumed to be present in another embodiment or example and it will be obvious to a person skilled in the art how those components may be used in the other exemplary embodiments.

FIG. 1 depicts a non-limiting example of a system of communications networks 100, in which embodiments herein may be implemented. The system of communications networks 100 comprises a first communications network 101 and a second communications network 102. Each of the first communications network 101 and the second communications network 102 may be sometimes also referred to as a cellular radio system, cellular network or wireless communications system. Each of the first communications network 101 and the second communications network 102 may for example be a network such as 5G system, or Next Gen network, or a newer system supporting similar functionality. In some examples, the telecommunications network 100 may be a non-cellular system, comprising network nodes which may serve receiving nodes, such as wireless devices, with serving beams. This may be a typical case in a 5G network using New Radio (NR). Each of the first communications network 101 and the second communications network 102 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi- Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as 6LowPAN, Bluetooth, or any cellular network or system.

Although terminology from Long Term Evolution (LTE)/5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, e.g., in the sixth generation (6G), the terms used herein may need to be reinterpreted in view of possible terminology changes in future radio access technologies.

In the context of this disclosure, the first communications network 101 may be understood to be an HPLMN. The second communications network 102 may be understood to be a VPLMN. Each of the first communications network 101 and the second communications network 102 may be understood to be operated by a respective operator.

The system of communications networks 100 may comprise a plurality of nodes, whereof a first node 111, a second node 112, and a third node 113 are depicted in FIG. 1. The first node 111 operates in the first communications network 101. The second node 112 operates in the second communications network 102. The third node 113 operates in the first communications network 101, or in the second communications network 102, based on functionality, as will be described later. Each of the first node 111, the second node 112 and the third node 113 may be understood, respectively, as a first computer system, a second computer system and a third computer system. In some examples, each of the first node 111, the second node 112 and the third node 113 may be implemented as a standalone server in e.g., a host computer in the cloud 120. Each of the first node 111, the second node 112 and the third node 113 may in some examples be a distributed node or distributed server, with some of their respective functions being implemented locally, e.g., by a client manager, and some of its functions implemented in the cloud 120, by e.g., a server manager. Yet in other examples, each of the first node 111, the second node 112 and the third node 113 may also be implemented as processing resources in a server farm.

The system of communications networks 100 may, in some embodiments, further comprise a fourth node 114, a fifth node 115, a sixth node 116, a seventh node 117, an eighth node 118, and a ninth node 119. In some embodiments, any of the fourth node 114, the fifth node 115, the sixth node 116, the seventh node 117, the eighth node 118, and the ninth node 119 may be independent and separated nodes. In other embodiments, any of the fourth node 114, the fifth node 115, the seventh node 117, the eighth node 118, and the ninth node 119 may be co-located, or be the same node. In particular examples, such as that depicted in FIG. 1, any of the fourth node 114, the fifth node 115, the seventh node 117, the eighth node 118, and the ninth node 119 may be co-located, or be the same node as the third node 113, as depicted in the example of FIG. 1. In other examples, the third node 113 may the co-localized or be the same node as the sixth node 116.

All the possible combinations are not depicted in FIG. 1 to simplify the Figure. In some examples of embodiments herein, the first node 111 may be a node capable of performing Network Data Analytics (NWDA) in the first communications network 101. The second node 112 may be any of a Visited Network as a Service Life Cycle Management (V-NaaS LCM), a Visited Network Management System Life Cycle Management (V-NWS LCM), a Virtual Network Virtualization Function Orchestrator (V-NFVO), or a Visited Transport Orchestrator (V-Transp. Orch) in the second communications network 102. The fourth node 114 may be a Business Support System (BSS) or data warehouse in the first communications network 101. The fifth node 115 may be a User Data Management (UDM) or a Home Subscriber Server (HSS) in the first communications network 101. The sixth node 116 may be a Business Support System (BSS) or data warehouse in the second communications network 102. The seventh node 117 may be a Business Support System (BSS) or data warehouse in the first communications network 101. The eighth node 118 may be a Network Exposure Function (NEF) or Over-The-Top (OTT) application server in the first communications network 101. The ninth node 119 may be an Online Charging System (OCS) or Offline Charging System (OFS) in the first communications network 101.

Any of the first node 111, the second node 112, and the third node 113, may be a core network node, e.g., a Network Data Analytics Function (NWDAF), a Mobility Management Entity (MME), Access Management Function (AMF), Session Management Function (SMF), Service GW node (SGW), Packet data GW node (PGW), Self-Organizing Network (SON) node, Operation Support System node (OSS) or similar coordinating and assistance node for supervising and assistance in network predictions for dimensioning purpose. In some particular examples, any of the first node 111, the second node 112, and the third node 113 may be Home Subscriber Server (HSS), a Home Location Register (HLR), or a Business support system (BSS) of a core network.

The system of communications networks 100 may comprise a plurality of radio network nodes, whereof a first radio network node 131, and a second radio network node 132 are depicted in FIG. 1. Each of the first radio network node 131 and the second radio network node 132 may typically be a base station or Transmission Point (TP), or any other network unit capable to serve a wireless device or a machine type node in the first communications network 101, and second communications network 102, respectively. Any of the first radio network node 131 and the second radio network node 132 may be e.g., a 3G Node B (NB), a 4G eNB, a 5G gNB. Each of the first radio network node 131 and the second radio network node 132 may be e.g., a Wide Area Base Station, Medium Range Base Station, Local Area Base Station and Home Base Station, based on transmission power and thereby also coverage size. Any of the first radio network node 131 and the second radio network node 132 may be e.g., a gNB, a 4G eNB, or a 5G or alternative 5G radio access technology node, e.g., fixed or WiFi. Each of the first radio network node 131 and the second radio network node 132 may be a stationary relay node or a mobile relay node. Each of the first radio network node 131 and the second radio network node 132 may support one or several communication technologies, and its name may depend on the technology and terminology used. Each of the first radio network node 131 and the second radio network node 132 may be directly connected to one or more networks and/or one or more core networks.

Each of the first communications network 101 and the second communications network 102 covers a geographical area which may be divided into cell areas, wherein each cell area may be served by a radio network node, although, one radio network node may serve one or several cells. In the non-limiting example depicted in FIG. 1, the first radio network node 131 serves a first cell 141, and the second radio network node 132 serves a second cell 142.

The first communications network 101 comprises a group of subscribers 151. The group of subscribers 151 is represented in FIG. 1 as a group of wireless devices. It may be understood that each subscribed in the group of subscribers 151 may use one or more wireless devices. In the non-limiting example scenario of FIG. 1 five subscribers in the group of subscribers 151 are represented as five wireless devices for illustrative purposes only. The number of subscribers, and the number of wireless devices that may be used by the subscribers may however vary. Any of the wireless devices used by the group of subscribers 151 may be also known as e.g., a UE, mobile terminal, wireless terminal and/or mobile station, mobile telephone, cellular telephone, or laptop with wireless capability, or a Customer Premises Equipment (CPE), just to mention some further examples. Any of the wireless devices used by the group of subscribers 151 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the first communications network 101. Any of the wireless devices may be wireless, i.e., it may be enabled to communicate wirelessly in the first communications network 101 or in the second communications network 102 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the first communications network 101 and the second communications network 102.

The first node 111 may communicate with the third node 113 over a first link 161, e.g., a radio link or a wired link. The third node 113 may communicate with the second node 112 over a second link 162, e.g., a radio link or a wired link. The first node 111 may communicate with the first radio network node 131 over a third link 163, e.g., a radio link or a wired link. The second node 132 may communicate with the second radio network node 132 over a fourth link 164, e.g., a radio link. The first radio network node 131 may communicate with any of the wireless devices used by the group of subscribers 151 over a respective fifth link 155, e.g., a radio link. The first node 111 may communicate with the second node 112 over a sixth link 166, e.g., a radio link, which may be a combination of the first link 161 and the second link 162. The first radio network node 131 may communicate with the each of the wireless devices over a respective first link 141, e.g., a radio link. Each of the first link 161, the second link 162, and the third link 163 may be a direct link or a comprise one or more links, e.g., via one or more other network nodes, radio network nodes or core network nodes.

Any of the first link 161, the second link 162, the third link 163, the fourth link 164, and the sixth link 166 may be a direct link or it may go via one or more computer systems or one or more core networks in the first communications network 101 or the second communications network 102, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In general, the usage of "first", "second", "third", "fourth", "fifth", "sixth", "seventh", "eighth" and/or "ninth" herein may be understood to be an arbitrary way to denote different elements or entities, and may be understood to not confer a cumulative or chronological character to the nouns they modify.

Figure 2:
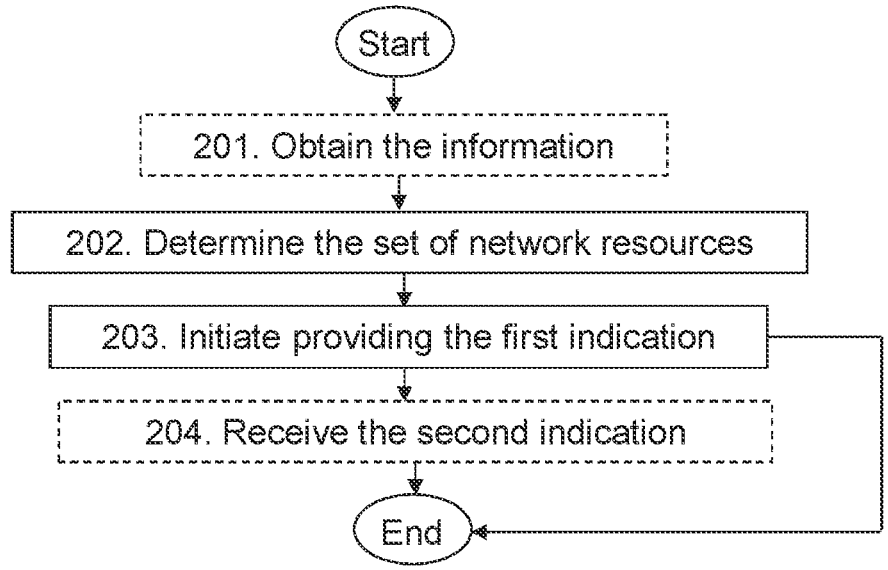
FIG. 2 is a flowchart depicting embodiments of a method in a first node, according to embodiments herein.

Embodiments of method performed by the first node 111, will now be described with reference to the flowchart depicted in FIG. 2. The method may be understood to be for handling roaming information. The first node 111 operates in a first communications network 101.

The method may comprise the actions described below. In some embodiments some of the actions may be performed. In some embodiments all the actions may be performed. In FIG. 2, optional actions are indicated with dashed boxes. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 201

Embodiments herein may be understood to be drawn to methods to optimize the provision of services to roaming subscribers in a VPLMN, that is, the second communications network 102. This may be understood to be done by analysing roaming data, and attempting to predict what will be the needs in terms of resources of the group of subscribers 151 when roaming in the second communications network 102.

Embodiments herein may therefore be understood to be drawn to a method to perform analytics at the HPLMN level for subscribers belonging to similar business purpose, SLA, etc., that is, for the group of subscribers 151. The goal of this analysis may be understood to be to help in for the optimization of the federated slice dimensioning at the second communications network 102, including radio and core network service requirements.

In order to conduct such an analysis, existing subscriber roaming information may be used towards the analytics to be performed as an additional functionality by the first node 111, e.g., the NWDA, and the level of network slice that may be required for the federated instance may then be determined. This required federated slice dimensions may then be used for orchestration of network resources at the second communications network 102, as instructed by first node 111. The first node 101, e.g., a NWDA component of the 5G architecture, may be understood to have the functionality of being able to provide slice specific network data analytics to a Home NetWork Slice Life Cycle Management function (H-NWS LCM), which will be described later. This procedure of providing Network Slice instance load level information to be used by an NF service consumer, as the H-NWS LCM, or e.g., Policy Control Function, PCF), may be realized in a request response procedure.

In order to assimilate the details of the group of subscribers 151, that is the HPLMN subscriber group belonging to similar business plan and SLA details to one system for performing analytics, and dimension the virtualized network functional parameters that may be required and which may be used for federated slice at the second communications network 102, in this Action 201, the first node 111 may obtain, from the third node 113 operating in the first communications network 101, data regarding a roaming behavior of the group of subscribers 151 of the first communications network 101. The first communications network 101 may be understood as the HPLMN of the group of subscribers 151. The data may comprise one or more of: a) first historical data on a roaming pattern in the second communications network 102 of the group of subscribers 151 during a first time period, b) second historical data on a pattern of outgoing calls, by the group of subscribers 151, to the second communications network 102, c) current data on users of the first communications network 101 roaming in the second communications network 102, the data being on intended future use of the second communications network 102 during a second time period, d) first data from Uniform Locators visited by the group of subscribers 151, e) second data from Over the Top service providers used by the group of subscribers 151, or f) third data on roaming plans activated by the group of subscribers 151.

Obtaining, may comprise receiving, collecting or gathering, e.g., via the first link 161. The data regarding the roaming behavior of the group of subscribers 151, that is, all the subscribers belonging to same "Business purpose and SLA", may be collected to have more meaningful analytics, such as Enhanced Mobile Broadband (EMBB) profiles with a predefined service level agreement (SLA) that may contain definitions of Key Performance Indicator (KPI) metrics as input for the analysis. In the first communications network 101 and/or in the second communications network 102, there may be a useful information available at different Network Function level and also additionally, the 5G exposure functionally may be exploited, where NEF NF, may be used to gather the data, from e.g., the OTT world, for effective prediction.

The first and second historical data, and static details may be fetched from the third node 113, where the third node 113 may be an existing BSS system, e.g., a data warehouse of the subscribers in the first communications network 101, and may be used for the predictive analytics. These details may include the historical data of the group of subscribers 151 on their roaming pattern in the second communications network 102, during the first time period, which may be a period of the year. An example of this may be, e.g., subscribers belonging to a similar business purpose who have roamed to the second communications network 102 in the month of December last year. These details may be obtained in this Action 201 by fetching them in order to predict the probability of the roaming pattern during the second time period, e.g., the coming month. Also, static data such as a pattern of voice calls by the group of subscribers 151 from the data warehouse may also be fetched so as to be pushed towards the first node 111 for prediction. For example, subscribers making Voice or Voice over LTE (VOLTE) calls to a particular VPLMN for a particular time of the year, e.g., voice, video, SMS, calls to Dubai in the month of December, combined with his earlier roaming history in particular country, may enable to predict that a the subscriber may be planning to visit the respective VPLMN in the coming days. These details may be sent to the first node 111 for the analysis. It may be noted that this data may be sent as a batch process from the third node 113 towards the first node 111 in push mode, or may be requested by the first node 111 in pull mode, in e.g., real time.

With particular regard to the first historical data on the roaming pattern in the second communications network 102 of the group of subscribers 151 during the first time period, this first historical data may include subscriber group roaming pattern, for e.g., subscribers who have roamed to a particular VPLMN in the month of December, spending limit, how many calls per day, incoming/outgoing call pattern, etc. . . . The underlying mechanism for, in this Action 201, obtaining the information from the third node 103, which may be a BSS/DW, may be either push, from BSS/DW, or pull, from the first node 111, e.g., a NWDA, at periodic intervals. In some embodiments, the first historical data may be obtained from the third node 113, wherein the third node 113 may be the fourth node 114.

With particular regard to the second historical data on the pattern of outgoing calls, by the group of subscribers 151, to the second communications network 102, that is, the pattern of outgoing call to the respective VPLMN, this may be considered more of a generic type of data where "X" subscribers may place a constant call to a respective VPLMN or roaming destination. Sometimes, not always, subscribers may tend to call more frequently when planning to visit their relatives in VPLMN, students coming back to the home of their parents, a business trip plan, etc. The mechanism here may also be push, from the third node 113, e.g., a BSS/DW, or pull from the first node 111, e.g., a NWDA, at periodic intervals. In some embodiments, the second historical data may be obtained from the third node 113, wherein the third node 113 may be the fifth node 115.

Overall, the first node 111 may have a history of a subscriber with an earlier history of roaming to a particular destination, and the particular destination where the subscriber may have initiated outgoing calls for better understanding and conclusion in some cases.

As for the current data on the users of the first communications network 101 roaming in the second communications network 102, that is, dynamic details for already roaming subscribers, these details may be obtained in this Action 201 by fetching them from the currently roaming subscribers in the second communications network 102. The currently roaming subscribers may be sent a confirmation message, e.g., an SMS or an Unstructured Supplementary Service Data (USSD) asking for a probable extension timeline of the roaming period in the second communications network 102, that is, the current VPLMN. The response to the message may be taken as a confirmation for a realistic projection of the roaming timelines of the out-roamers for the first communications network 101 for a particular VPLMN such as the second communications network 102. The details of the subscribers and the roaming timelines may be sent for analytics of the federated slicing optimization. This service may be, e.g., free of cost for the subscriber, e.g., an SMS reply on the additional days he/she is going to be in a particular country, and there may be lot of subscribers who may not reply back. In some embodiments, the first current data on the users may be obtained from the third node 113, wherein the third node 113 may be the sixth node 116 in the first communications network 101.

With regards to the first data from Uniform Locators and the second data from OTT service providers, these details may be obtained in this Action 201 by fetching them by either of the two mechanisms described next. A first mechanism may be a URL analysis. In this mechanism, the URL details coming from the Unified Data Repository (UDR) and/or Charging Data Records (CDR) of the data session of the group of subscribers 151, that is, existing HPLMN subscribers from the data warehouse, may be analyzed for a real time event at the the second communications network 102, that is, a VPLMN destination. Based on these details in the UDR from the data warehouse, and combined with the past historical roaming pattern, the possible out-roamers may be predicted for the second communications network 102, a particular VPLMN, for a particular period. This data may be used to substantiate the roaming predictability of the HPLMN subscribers with the necessary analytics. In some embodiments, the first data from Uniform Locators may be obtained from the third node 113, wherein the third node 113 may be the seventh node 117.

A second mechanism may be OTT Based. In this mechanism, the home operator may obtain the predicted number and profiles of high probable out-roamers to a particular destination such as the second communications network 102, a VPLMN, from a partnered OTT, e.g., social media, travel portal etc. . . . Any confirmation of travel to a particular VPLMN for one of the subscribers of the group of subscribers 151 from the OTT may be sent to the first node 111, that is, the analytics function of the HPLMN. These details may give a high probability of the roaming subscribers. This engagement may require the support on NEF NF as entry point to the trusted domain of the operator of the first communications network 101. For example, a travel portal site may share the information with the first communications network 101, that is, a respective HPLMN, as agreed as per business agreement. In some embodiments, the second data from OTT service providers may be obtained from the third node 113, wherein the third node 113 may be the eighth node 118.

As for the third data on the roaming plans activated by the group of subscribers 151, this may be understood to be charging plan based. The first node 111 may obtain, e.g., fetch, in this Action 201, the profiles and numbers of subscribers in the first communications network 101 who may have opted for charging plans, bundles, offers etc. . . . which may be specific for roaming to a particular destination for a period in advance. For example, the home operator may offer a postpaid or prepaid tariff plan for a period of 15 days for out-roamers to attend a specific event, e.g., FIFA, music concert etc. . . . The profiles of subscribers who may have opted for this charging plan may be sent to the first node 111 beforehand. In some embodiments, the third data on the roaming plans may be obtained from the third node 113, wherein the third node 113 may be the ninth node 119.

Action 202

In this Action 202, the first node 111, determines a set of network resources predicted to be required by the group of subscribers 151 of the first communications network 101, while roaming in the second communications network 102.

Determining may be understood as calculating, predicting, estimating, or similar.

In some embodiments, the first communications network 101 may be a home 5th Generation (5G) network, the second communications network 102 may be a visited 5G network, and the set of network resources predicted to be required may be understood to be to instantiate a federated slice in the second communications network 102.

The determining in this Action 202 may be based on the obtained information.

The set of network resources may be, for example, needed capacity, for the federated deployment of VM and micro services, in the cloud infrastructure such as CPU processing capacity, e.g., CPU cores, internal memory, disk space, virtual network interfaces and transport network link capacity that may be required towards access network in VPLMN and transport network link capacity towards application servers.

Action 203

Once the set of network resources predicted to be required by the group of subscribers 151 while roaming in the second communications network 102 may have been determined by the first node 111 in Action 202, relevant information may be shared with the second communications network 102. Accordingly, in this Action 203, the first node 111 initiates providing a first indication of the determined set of network resources to the second node 112 operating in the second communications network 102.

Initiating may be understood as triggering, starting, or enabling.

Providing may be understood as e.g., sending, for example, via the sixth link 166.

The first indication may comprise, as a non-limiting example, first, an infrastructure level requirement at the second communication network 102, that is the VPLMN. The infrastructure level requirement may be such e.g., network, compute, storage, etc. used for network slicing at the core level. Second, it may comprise radio level details at the second communication network 102, that is the VPLMN. With an increase in the number of roaming subscribers, the bandwidth may be needed on the core level, as well as at the radio level. Therefore, data such as the number of subscribers expected to be added to second communication network 102 may be shared. In case the second communication network 102 may not be able to support the same, this may be notified back to the first communication network 101, as described in the next Action.

Action 204

In some cases, it may be that when the second node 112 may receive the first indication, and may try to allocate the set of resources, those resources for the group of subscribers 151 according to a pre-existing agreement between the operator of the first communications network 101 and the operator of the second communications network 102 may not be sufficient. If so, there may be a notification sent back to the first node 111 that the resource is not available, or that there are limited resources allocated with a predicted service duration information.

According to the foregoing, in some embodiments, the first node 111 may, in this Action 204, receive a second indication from the second node 112. The second indication may indicate that the second node 112 is to refrain from allocating the set of network resources.

The first node 111, or another node in the first communications network 101, may then use the information comprised in the second indication to decide if the federated network slice may need to be removed, or if the service degradation may be considered acceptable in relation to service level agreement with e.g., an Enterprise customer that requested the federated network slice service.

Figure 3:
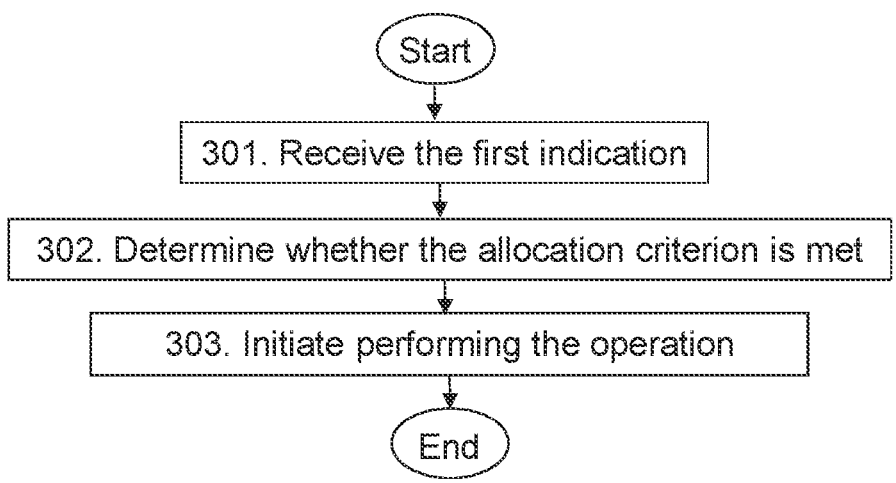
FIG. 3 is a flowchart depicting embodiments of a method in a second node, according to embodiments herein.

Embodiments of a method performed by the second node 112, will now be described with reference to the flowchart depicted in FIG. 3. The method is for handling roaming information. The second node 112 operating in a second communications network 102.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, the first communications network 101 may be a home 5G network, the second communications network 102 may be a visited 5G network, and the set of network resources predicted to be required may be to instantiate a federated slice in the second communications network 102.

Action 301

In this Action 301, the second node 112, receives, from the first node 111 operating in the first communications network 101, the first indication of the set of network resources predicted to be required by the group of subscribers 151 of the first communications network 101 while roaming in the second communications network 102.

The receiving may be implemented, e.g., via the sixth link 166.

Action 302

After receiving the first indication from the first node 111, the second node 112, in this Action 302, determines whether or not an allocation of the set of network resources for use by the group of subscribers 151 meets an allocation criterion.

The allocation criterion may be, for example, the pre-existing agreement between the operator of the first communications network 101 and the operator of the second communications network 102. Otherwise, the allocation criterion may be based on a policy of the operator of the second communications network 102. For example, a NF service consumer may make a policy decision based information on a load level for the network slice instance.

That is, in this Action 302, the second node 112 may decide whether or not it may be able to provide the allocation for the set of network resources for use by the group of subscribers 151, as may have been requested by the first node 111.

Action 303

In some embodiments, the second node 112 may, in this Action 303, initiate performing an operation based on a result of the determination, the operation being selected out of: a) allocating the set of network resources for use by the group of subscribers 151 with the proviso the that criterion is met, or b) sending the second indication to the first node 111, with the proviso the that criterion is not met. The second indication indicates that the second node 112 is to refrain from allocating the set of network resources.

Embodiments of a method performed by the third node 113, will now be described with reference to the flowchart depicted in FIG. 3. The method is for handling roaming information. The third node 113 operates in one of the first communications network 101, and the second communications network 102.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, the first communications network 101 may be a home 5G network, the second communications network 102 may be a visited 5G network, and the set of network resources predicted to be required may be to instantiate a federated slice in the second communications network 102.

Action 401

In this Action 401, the third node 113 determines the data regarding the roaming behavior of the group of subscribers 151 of the first communications network 101. The data comprises at least one of: a) the first historical data on the roaming pattern in the second communications network 102 of the group of subscribers 151 during the first time period, b) the second historical data on the pattern of outgoing calls, by the group of subscribers 151, to the second communications network 102, c) the current data on the users of the first communications network 101 roaming in the second communications network 102, the data being on intended future use of the second communications network 102 during the second time period, d) first data from Uniform Locators visited by the group of subscribers 151, e) the second data from Over the Top service providers used by the group of subscribers 151, f) the third data on roaming plans activated by the group of subscribers 151.

In some embodiments, the third node 113 may be the fourth node 114, e.g., a BSS/Data warehouse in the first communications network 101. In such embodiments, the data may be the first historical data on the roaming pattern, and the information may be first information based on the first historical data.

In some embodiments, the third node 113 may be the fifth node 115, e.g., a UDM/HSS in the first communications network 101. In such embodiments, the data may be the second historical data on the pattern of outgoing calls, and the information may be second information based on the second historical data.

In some embodiments, the third node 113 may be the sixth node 116, e.g., a UDM/HSS in the first communications network 101. In such embodiments, the data may be the current data on the users of the first communications network 101, and the information may be third information based on the current data.

In some embodiments, the third node 113 may be the seventh node 117, e.g., a BSS/Data warehouse in the first communications network 101. In such embodiments, the data may be the first data from Uniform Locators visited by the group of subscribers 151, and the information may be fourth information based on the first data.

In some embodiments, the third node 113 may be the eighth node 118, e.g., an NEF/OTT in the first communications network 101. In such embodiments, the data may be the second data from Over the Top service providers used by the group of subscribers 151, and the information may be fifth information based on the second data.

In some embodiments, the third node 113 may be the ninth node 119, e.g., an OCS/OFS in the first communications network 101. In such embodiments, the data may be the third data on roaming plans activated by the group of subscribers 151, and the information may be sixth information based on the third data.

Action 402

After determining the data regarding the roaming behavior of the group of subscribers 151 of the first communications network 101, the third node 113, in this Action 402, provides the information based on the determined data, to the first node 111 operating in the first communications network 101.

Providing may be understood as e.g., sending, for example, via the first link 161.

The methods just described as being implemented by the first node 111, the second node 112 and the third node 113 will now be described in further detail with specific non-limiting examples in the next eight figures, wherein the first node 111 is a NWDA in the first communications network 101.

Figure 5:
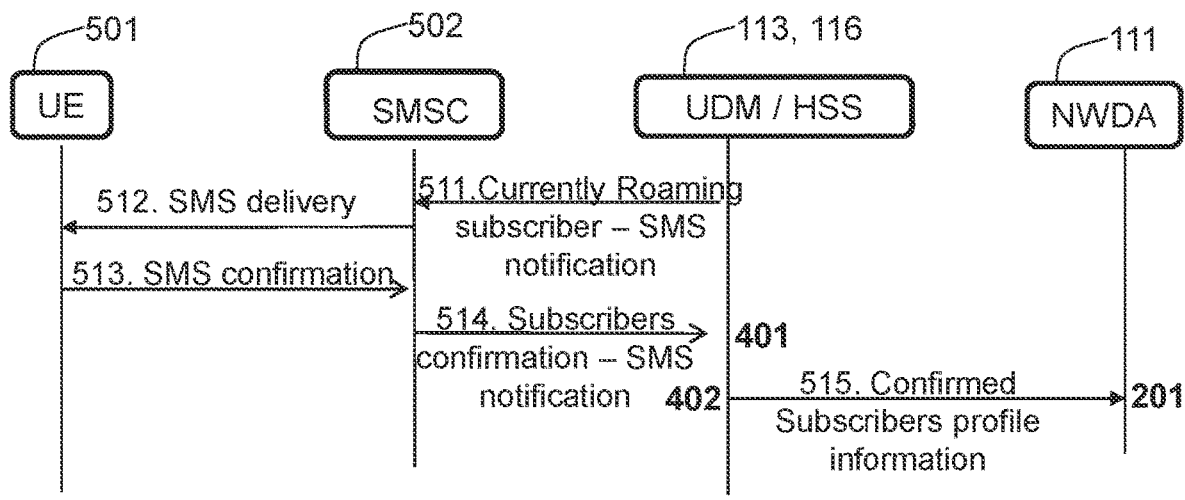
FIG. 5 is a schematic diagram depicting a non-limiting example of signalling between nodes in a communications network, according to embodiments herein.
Figure 6:
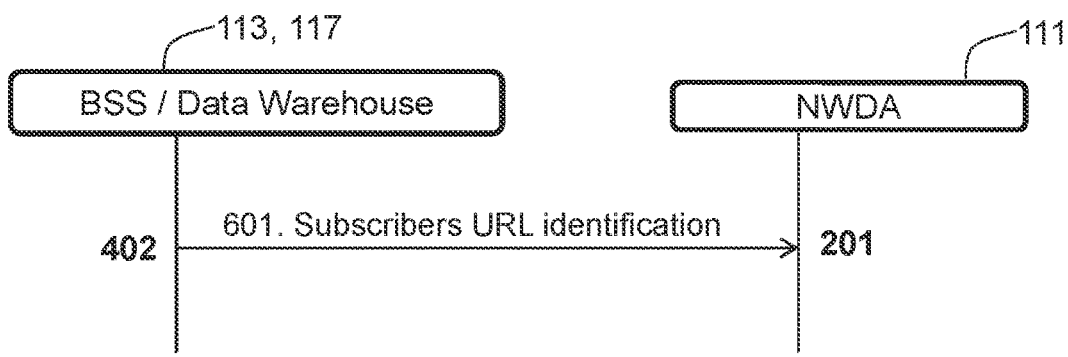
FIG. 6 is a schematic diagram depicting a non-limiting example of signalling between nodes in a communications network, according to embodiments herein.

FIG. 5 is a signalling diagram depicting a non-limiting example of embodiments herein. In this non-limiting example, the third node 113 is the sixth node 116, the UDM/HSS in the first communications network 101. At 511, the third node 113 sends a confirmation message, e.g., via SMS, to a first subscriber UE 501 in the group of subscribers 151. The SMS asks for a probable extension timeline of the roaming period in the second communications network 102, that is, the current VPLMN. This SMS is delivered to an intermediate Short Message Service Center (SMSC) 502, which will coordinate the SMS delivery to the subscriber UE 501. At 512, the SMSC 502 delivers the SMS notification message to the subscriber UE 501. The subscriber UE 501 confirms on the possible extension of the roaming period through a reply back SMS which, at 513, is carried back to the SMSC 502. The response of the message from the SMSC 502 towards the sixth node 116 at 514 is taken as a confirmation for a realistic projection of the roaming timelines of the out-roamers for the first communications network 101 for a particular VPLMN, in this case, the second communications network 102, in accordance with the determination described in Action 401. There exists a possibility that the user of the subscriber UE 501 does not reply, therefore, the SMS reply from the subscriber UE may be ignored by the first node 111 in the analytics performed in Action 202. The confirmed profile information of the subscriber UE 501 is sent to the first node 111 at 515, in agreement with Action 402, for the roaming prediction analytics. This may be understood to give a high possibility of the prediction of the currently roaming subscribers extension. This extension period for the roaming subscribers may be understood to help in negotiating the federated slice parameters. The sixth node 116 may push each confirmed subscriber profile in agreement with Action 402, or it may assimilate the subscriber profile details in a batch, and push the same periodically towards the first node 111, also as another example of Action 402. The first node 111 then obtains FIG. 6 is another signalling diagram depicting another non-limiting example of embodiments herein. In this non-limiting example, the third node 113 is the seventh node 117, a BSS and/or a data warehouse in the first communications network 101. The URL details coming from the UDR and/or CDR of a data session of existing subscribers in the first communications network 101 from the seventh node 117, e.g., a data warehouse, are identified and analyzed for a real time event at the second communications network 102, a VPLMN destination. At 601, these subscriber details are sent, in accordance with Action 402, to the first node 111 for roaming prediction through a push mechanism towards the first node 111 at a periodic interval. The first node 111 obtains this information according to Action 201.

Figure 7:
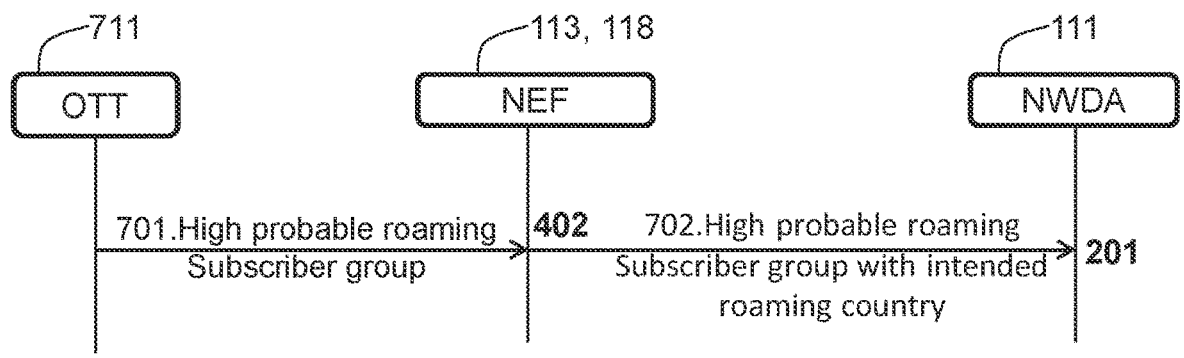
FIG. 7 is a schematic diagram depicting a non-limiting example of signalling between nodes in a communications network, according to embodiments herein.

FIG. 7 is another signalling diagram depicting another non-limiting example of embodiments herein. In this non-limiting example, the third node 113 is the eighth node 118, e.g., an NEF in the first communications network 101. At 701, the predicted number and profiles of high probable out-roamers subscribers to the second communications network 102, that is, a particular VPLMN destination from a partnered OTT entity 711, such as a social media, a travel portal etc. are sent to the third node 113, here an NEF in the first communications network 101. This pushing of the data by the OTT entity 711 may be done whenever there may be a confirmation of high probability roaming for, e.g., travel ticket confirmation, Hotel Stay confirmation, Social Media check-in etc. . . . It may be noted that this use case assumes that the OTT entity 711 and the operator of the first communications network 101 have an agreement and also share the information from the OTT entity 711 as approved by the end customer. At 702, in agreement with Action 402, the eighth node 118 pushes the relevant subscriber profile details to the first node 111 upon confirmation of a high probability from the OTT entity 711. The first node 111 receives this information according to Action 201. This subscriber profile push may be understood to help the first node 111 in the near real time prediction, according to Action 202, of the possible roaming timeline of the subscriber in the second communications network 102, as it may be understood to similarly do so for any other relevant VPLMN.

Figure 8:
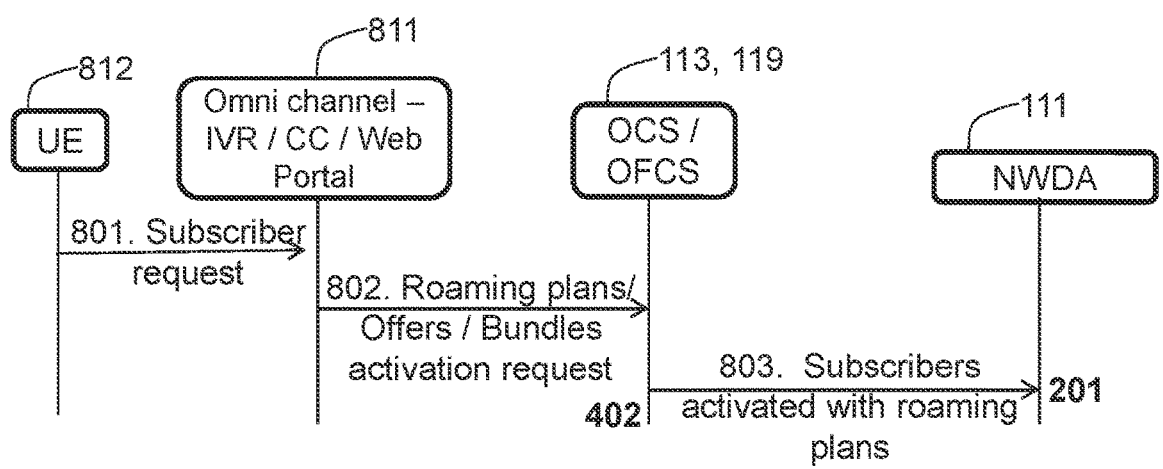
FIG. 8 is a schematic diagram depicting a non-limiting example of signalling between nodes in a communications network, according to embodiments herein.

FIG. 8 is another signalling diagram depicting another non-limiting example of embodiments herein. In this non-limiting example, the third node 113 is the ninth node 119, an OCS/OFS in the first communications network 101. At 801, the subscriber in the group of subscribers 151 requests through first subscriber UE 501, an activation of roaming plans, offers, bundles, etc. . . . through an omni-channel source 811, such as a customer care, Interactive Voice Response (IVR), web portal etc. . . . At 802, the omni-channel source 811 notifies the ninth node 119 for the activation of the relevant roaming plans/offers/bundles for the subscriber. The ninth node 119 triggers an activation of the roaming plan for the specific subscriber profile. At 803, in accordance with Action 402, the profiles of the subscribers who have opted for charging plans/bundles/offers etc. which are specific for roaming to a particular destination for a period are sent to the first node 111 through a push mechanism either for each subscription plan activation, or it may be for batch as well. This information sent to the first node 111 is received in Action 201 and provides a real time information for roaming predictive analytics, which may be then performed according to Action 202.

Some examples of the information shared from the first communications network 101 towards the second communications network 102 in terms of requested infrastructure from the first communications network 101 towards the second communications network 102 for federated slice dimensioning will be provided now. The following two Figures depict non-limiting examples of the available infrastructure and/or artifacts that may be related to a federated slice.

Figure 9:
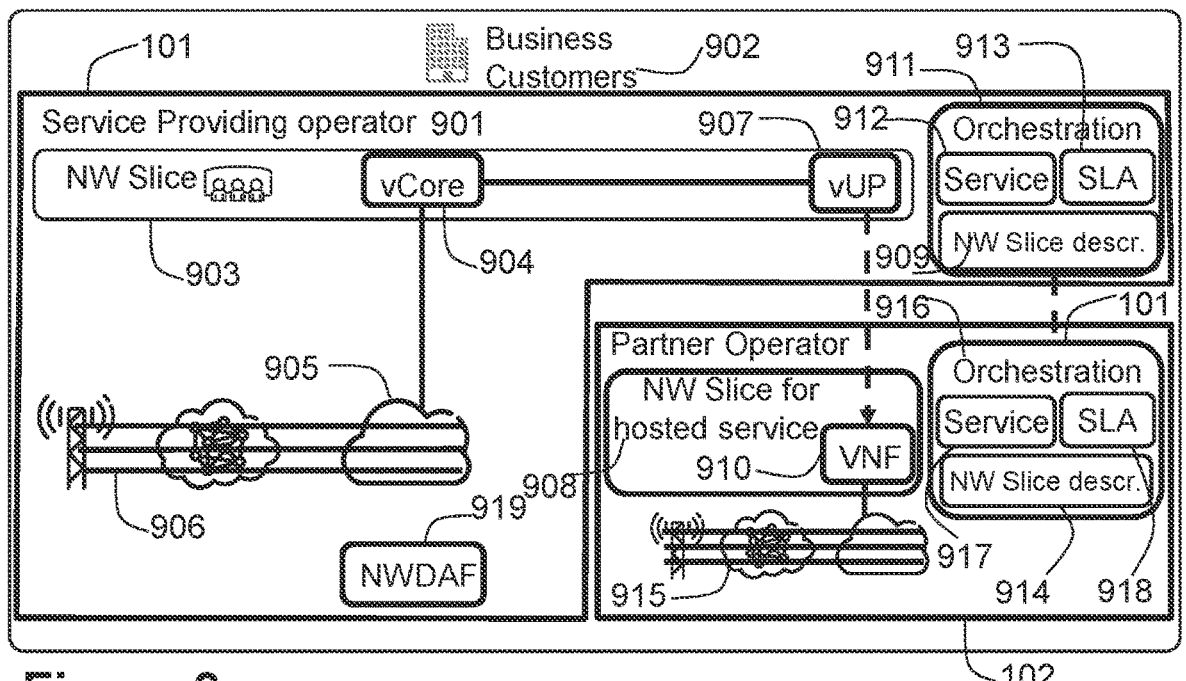
FIG. 9 is a schematic diagram illustrating a high level view of a federated slice with network slice management and orchestration, according to embodiments herein.

FIG. 9 is a schematic diagram depicting a non-limiting example of a high level view of a federated slice with network slice management and orchestration. FIG. 9 depicts schematically how the first communications network 101 may act as a service providing operator 901, which provides services to business customers 902. The services are provided through a NetWork (NW) slice 903, which comprises a virtualized core network 904 deployed in a cloud computing infrastructure 905 located in first communication network 101, as part of the first node 111, and connected to the access network of a telecommunications system 906, and a virtualized User Plane (vUP) 907, part of the second node 112 by deployment in the second communications network 102, using the NW Slice service for hosted services 908 that is provided by the second communications network 102. The second communications network 102 may be understood to act as "partner Operator". The vUP 907 is deployed, as defined in network slice description 909 into a VNF infrastructure service 910, of the NW slice for hosted services 908. The NW slice 903 is managed by an LCM orchestrator 911 denoted as "Orchestration", that monitors and takes action to scale the network slice capacity, based on input from a NWDAF 919, for the network slice 903 as defined in service description 912. The service description 912 is delivered in line with the SLA 913 to the business customers 902 and the network slice description 909. The service description 912 may be defined as requirements and policies in a Service Level Agreement (SLA) 913, that may require a federated network deployment using network resources from a partner, the network resources being located in the second communications network 102. To provide the service "NW slice for hosted services" to be used by roaming subscribers, such as the group of subscribers 151, the second communications network 102 instantiates a network slice 908, using the NW slice orchestration mechanism, that is the NW slice LCM orchestrator 916, and the network slice configuration description 914 for providing hosted services. One of the slice configuration parameters in the network slice configuration description 914 may be a default parameter for resource allocations in second communication network 102. The total resource allocation is done based on the configuration parameters of the network slice description 909 and the network slice configuration description 914, and the predicted input from the NWDAF 919. The NW slice for hosted services 908 in the second communications network 102 is connected to the access network of a telecommunications network 915 of the second communications network 102. The NW slice for hosted services 908 is managed by an orchestrator 916, under a service 917 requirement by the customers, the SLA 918 with the first communications network 101, with input parameters from the network slice description 909, predicted input parameters for resource allocation coming from the NWDAF 919, and a NW slice LCM orchestrator 916. The NW slice for hosted services 908 will be set up according to the set of network resources predicted to be required by the group of subscribers 151 of the first communications network 101, as indicated by the first node 111 in the first indication. The orchestrator, including the network slice LCM orchestrator 916 of the network slicing, infrastructure request, etc. . . . are components which may be elaborated and modified in the below section as part of the component diagram.

Figure 10:
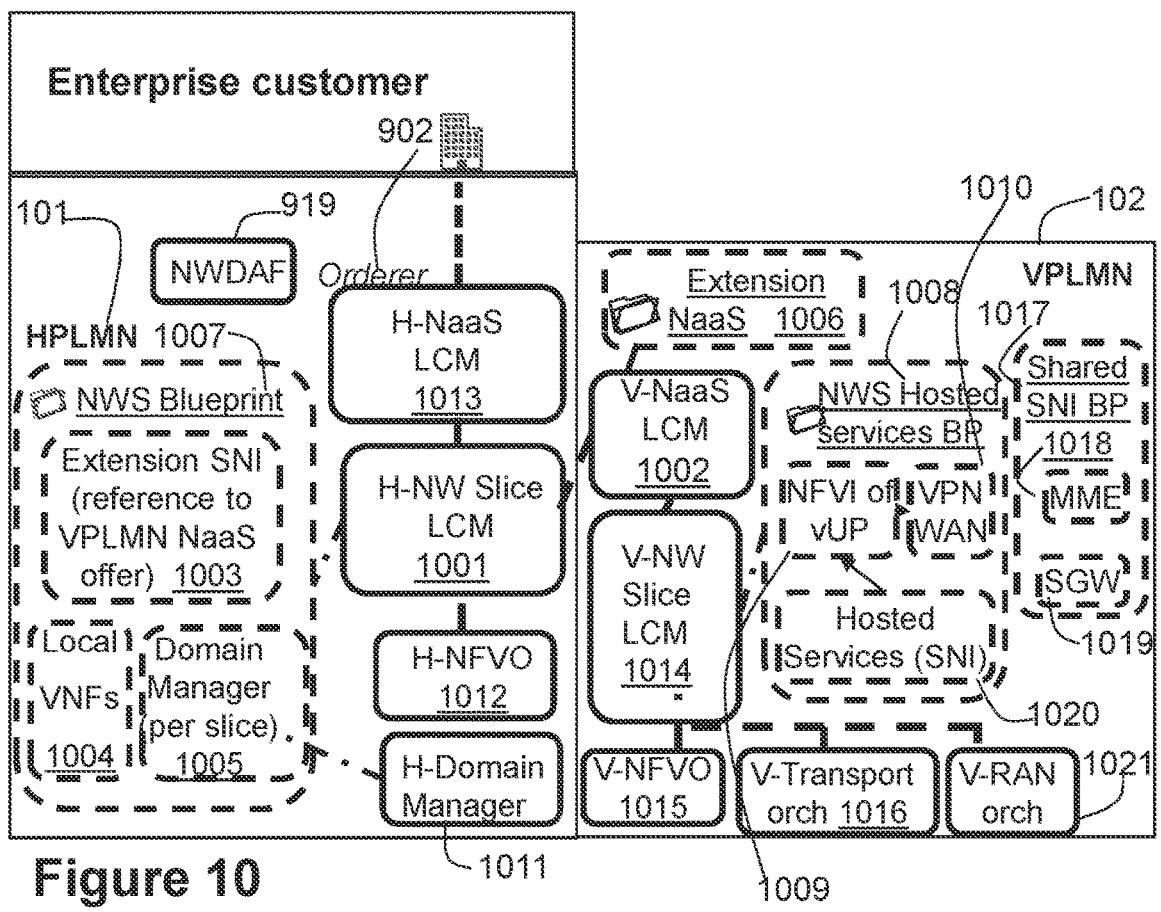
FIG. 10 is a schematic diagram illustrating a high level view of components in a federated slice within a HPLMN and a VPLMN, according to embodiments herein.

FIG. 10 is another schematic diagram depicting a non-limiting example of a high level view of federated slice components and a network slice lifecycle management, H-NW slice LCM 1001, which may be part of the first node 111, of the first communications network 101. The H-NW slice LCM 1001 may manage part of the resources for the first node 111 that may be needed for the NW slice 903, may interact with another NW slice LCM 1002, part of the second node 112, of the second communications network 102, and may manage part of resources for the second node 112 that may be needed for the NW Slice for hosted services 908. The federated slice components are depicted for both, the first communications network 101 and the second communications network 102. The H-NW slice LCM 1001 in the first communications network 101 requests a cloud service of type Network Slice as a service (NaaS) and interacts with the V-Naas LCM 1002 function of the second communications network 102 to provide the NaaS, and handle the life cycle management of the delivered NaaS. The H-NW Slice LCM 1001 comprises an extension Subnetwork Instance (SNI) 1003 network configuration description, that is, a network blueprint, Local VNFs 1004 description and a domain manager 1005 configuration description per slice. The H-NW Slice LCM 1001 in the first communications network 101 looks up available services by fetching the reference to the V-NaaS LCM function 1002 from the service catalogue describing an Extension NaaS 1006. In the interaction between the H-NW Slice LCM 1001 and the V-NaaS LCM 1002, an NWS Blueprint 1007, including the local VNFs description 1004, e.g., a VNF description of a virtualized node vUP 907 is sent to the V-NaaS LCM 1002, which instantiates an extension slice using the NWS for Hosted services Blue Print (NWS BP) 1008 that includes slice description parameters in the network slice configuration description 914. The NWS for Hosted services BP 1008 describes the extension slice infrastructure in the second communication network 102, including a set of possible virtualized infrastructure descriptions for different types of hosted services 1020, where the Network functions virtualization infrastructure (NFVI) infrastructure description for the vUP 1009 is one of the possible types, which is indicated in the Figure as "NFVI of vUP", and which corresponds to the service description of the Extension NaaS 1006, with the additional NWS Blueprint description 1007 that includes slice description parameters in the network slice description 909, received from the H-NW Slice LCM 1001. When the extension SNI 1003 is instantiated including the vUP 907 that is deployed in NW slice for hosted service 908, as described in the local VNF descriptions 1004, it may be understood that the instantiated vUP 907 may be managed by the home domain manager component 1011, that is instantiated by the H-NW Slice LCM 1001 using the domain manager 1005 configuration description per slice in the first communication network 101. The V-Naas LCM 1002 provides the respective resources, and infrastructure for the the vUP 907, the connection to and allocation of radio access resources using the V-RAN orchestrator 1021, including integration with the first communications network 101 using the V-Transport orchestrator 1016 to configure a Wide Area Network (WAN) Virtual Private Network (VPN) 1010. However, the configuration part of the vUP 907 may be understood to be managed by the first communications network 101. A management VPN, as described in the blue print 1010, that is, the VPN that is connected over the Wide Area Network (WAN), may be needed to interconnect the vUP 907 to the H-Domain manager 1011 that is instantiated in the first communications network 101 using the blueprint description for the domain manager 1005. The access network of the telecommunications network 915 that connects the network slice for hosted services 910 to the second radio network node 132, is instantiated by a vNaaS LCM 1002 or by OSS management operations using the shared sub-network instance (SNI) blueprint configuration description 1017. The blueprint includes the network functions of the second node 112 of the second communication network 102, e.g. mobility management MME function 1018 and user-plane gateway (GW) functions 1019 to interwork with the second radio network node 132. Other entities depicted in FIG. 10 will be described later, in relation to FIG. 11 and FIG. 12.

Figure 11:
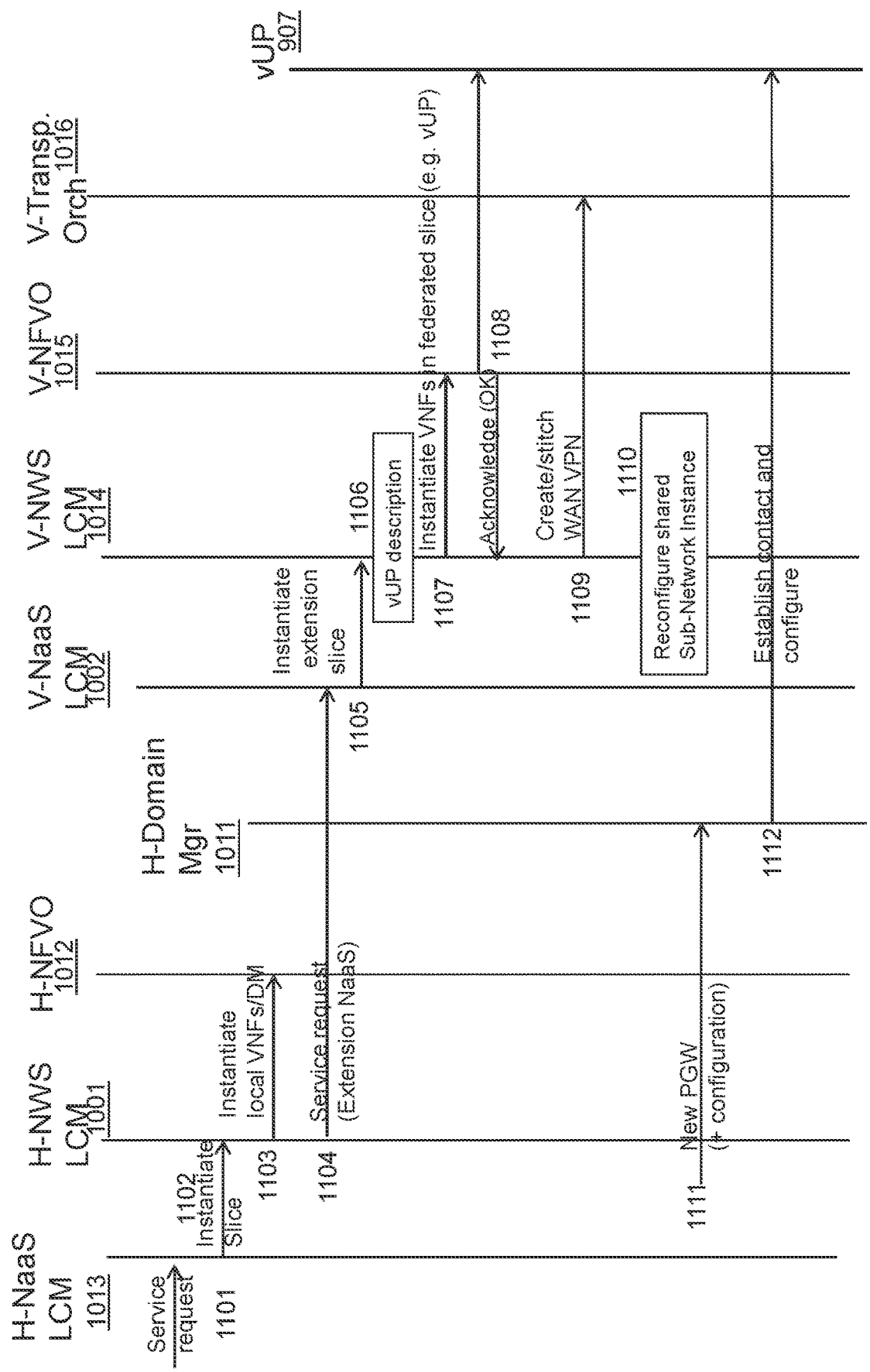
FIG. 11 is a schematic diagram depicting examples of signalling between nodes in a communications network, according to existing methods.

FIG. 11 is a signalling diagram depicting a non-limiting example of the call flow of how a new network slice may be initiated at the second communications network 102 and how the vUP 907 of the first communications network 101 may be deployed for federated slices according to existing methods. This call flow explains the architecture described in FIG. 9 and FIG. 10 in terms of an example of service instantiation. At 1101, a customer requests a Network as a Service (NaaS) for a plurality of subscribers, e.g., enterprise subscribers of the first communications network 101. This may be understood as an "offer" available in the service catalogue of the first communications network 101, and made orderable. The customer may provide some input and/or customer specific data that may be needed during the instantiation, such as, e.g., region of service, number of end user devices, capacity, demand, etc. . . . At 1102, based on the definition of the requested offer, the H-NaaS LCM 1013 maps this to specific type of network slice blue print that defines network slices or sub-network slices that may be needed. As an example, in case the NaaS request covers an agreement to have a federated slice, and the coverage is larger than the first communications network 101, the NWS-LCM 1001 of the first communications network 101 requests an extension NaaS slice 1006 from the NaaS-LCM of the second communications network 102, that is, the V-NaaS-LCM 1002. It may also specify some of the input parameters required at the network slice H-NWS-LCM 1001, managed by the first node 111, which may be understood to be defined by the NWS Blueprint 1007, or how to derive these parameters e.g., based on customer data, SLA data etc. At 1103, a request is sent downwards to the H-NFVO 1012 to create the local virtualized network functions vCore 904, that may be managed by the first node 111, belonging to the new NW slice 903 in the first communications network 101. At 1104, the H-NW slice LCM 1001 reads the NWS Blueprint 1007 and executes a workflow to request a new Extension NaaS 1006. Resource needs are determined, e.g., based on NWS Blueprint 1007 and inputs covering, such as computation and memory requirements of network functions instances and network resources. A configuration is generated for each VNF, or management instance, based on NWS Blueprint 1007, input parameters and back-end services. Some properties may need to be assigned, or may be unique, such as IP addresses or certain identifiers. At 1105, the V-NaaS LCM 1002 requests a new instance of an extension slice from the V-NWS LCM 1014. The V-NWS LCM 1014 layer may request WAN VPN 1010 infrastructure resource shares from transport, from the access network of a telecommunications network 915 of the second communications network 102 and internal networking resources in the cloud domain, e.g., separate dedicated resource allocation or by allocation of a "priority" level for when the shared resource is used, e.g., using different server marking on IP layer and/or in radio scheduler. At 1106 the local VNF 1004 and the NFI of vUP description 1009 is combined to describe how to orchestrate the VNF vUP in the second communication network 102. At 1107, the V-NWS LCM 1014 requests V-NFVO 1015 to instantiate either individual VNFs or complete ETSI NFV network services, using the updated NFV description of vUP. At 1108, one instance of a VNF vUP 907 is shown. This sequence may be repeated for all VNF instances that may be required, depending on the network Extension NaaS 1006 and NWS Blueprint 1007. At 1109, when the VNF instantiation is completed OK, the WAN to VPN stitching is done, which may be understood to combine the two parts vCore 904 and vUP 907 of network slice 903 into one network slice, is done between the first communications network 101 and the second communications network 102. In the procedure 1111, as a result of successful deployment of vUP 907, the VNFs 910, that is, the vUP 907 in the extension slice is connected to the network and the management functions of the first communications network 101. At 1110, the newly created VNFs 910, that is, the vUP 907, is connected to the access telecommunications network 913 of the second communications network 102, through a reconfiguration of a shared sub-network slice instance that is defined for federated networking. At 1111 and 1112, post-install, the H-NWS-LCM 1001 may interact directly with VNFs 910, in this case vUP 907, and/or by intra-slice management handled by the H-Domain manager 1011 to fully configure the network slice 903.

Figure 12:
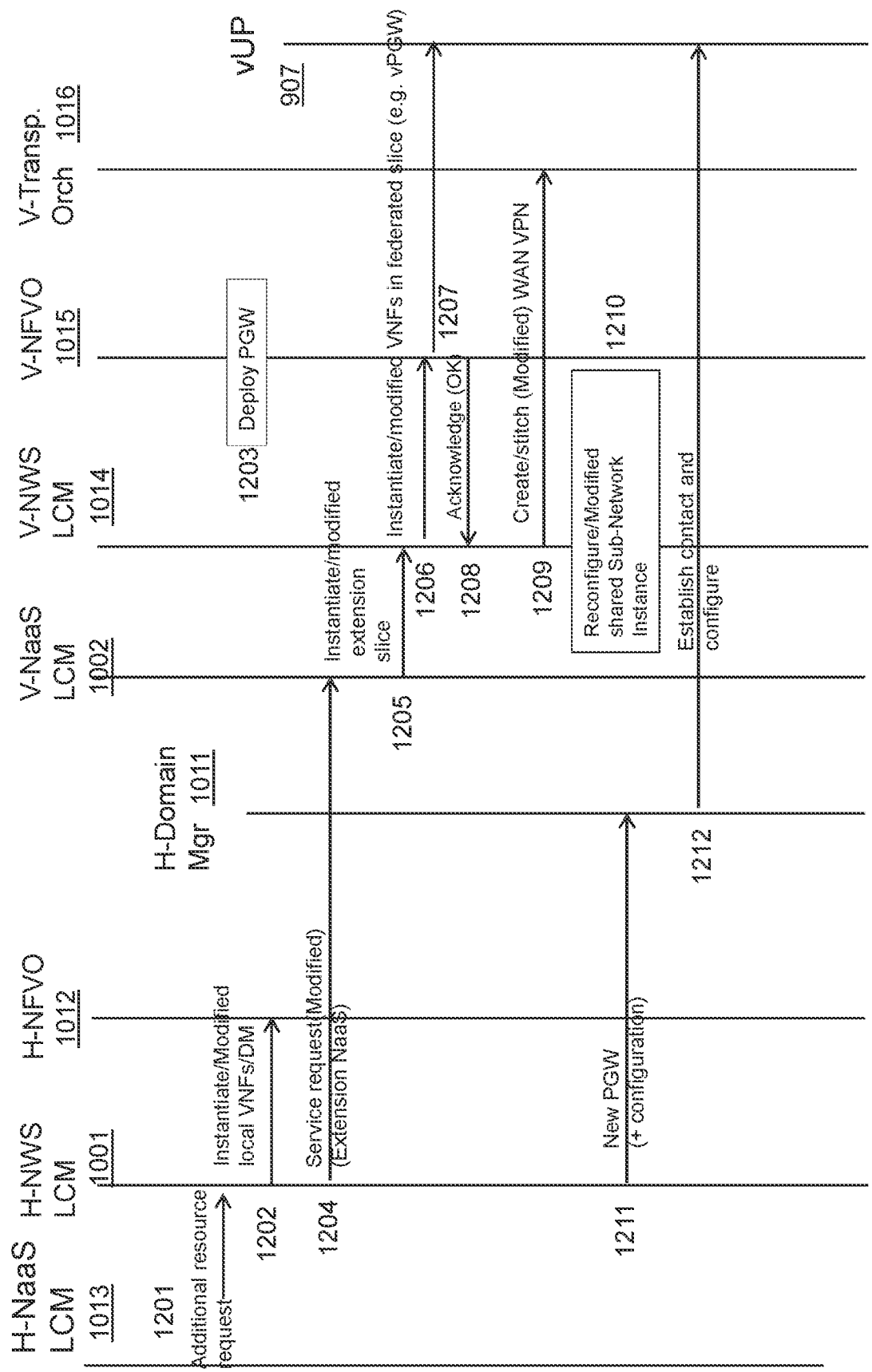
FIG. 12 is a schematic diagram depicting examples of signalling between nodes in a communications network, according to embodiments herein.

FIG. 12 is another signalling diagram depicting a non-limiting example of a modified version of the call flow depicted in FIG. 11, according to embodiments herein. In FIG. 12, the H-NaaS LCM 1013 in the first node 111 receives information from the NWDAF 919, located in the first communications network 101, that it is a risk that requested service level SLA cannot be met in a second time period, that is, in the future. The H-NaaS LCM 1013 provides the respective information towards the H-NWS LCM 1001, that forwards the request for the additional resource requirement towards the V-NWS LCM 1014 of the second communications network 102.

At 1201, the H-NaaS LCM 1013 sends the request for additional resources, such as infrastructure details, e.g., compute, network, storage, etc. . . . , expected in the second time period, that is, the future. Additionally, the request for additional resources may also cover the resources which may be needed for radio capacity planning, for example, the additional subscribers that may be expected in the next 2 days. At 1202, the H-NWS-LCM 1001 parses the NWS blueprint 1007 with the resource request and executes a workflow for instantiation or expansion. Resource needs may be determined, e.g., based on blueprint 1007 and inputs from H-NaaS LCM 1013 on needed resource extensions, such as required infrastructure resources compute, memory, networking of the network functions, and a configuration is generated for each VNF 1004, or management instance, based on NWS blueprint 1007, input parameters and back-end services. Some properties may need to be assigned, that is, be unique, such as IP addresses or certain identifiers. It may be noted that the information received from the H-NaaS LCM 1013 may be considered before going ahead with blue print with requested resources dynamically, and not based on static templates. At 1203, there is already a vUP 907 instance deployed done by the V-NFVO 1015 before the request 1201 is done. At 1202, in case the vCore 904 instance, already deployed as in FIG. 11, may need to be scaled to increase more capacity, more instance of vCore 904, or a different configuration of used resources e.g. compute, memory, network, the network slice H-NWS-LCM 1001 may request modifications of infrastructure resource through the H-NFVO 1012. At 1204, the NWS-LCM 1001 requests from the v-NaaS LCM 1002 to make a resource modification of the Extension NaaS 1006 referring to the NW slice 908, and the V-NFVO 1015. At 1205, the VNF infrastructure 910, including vUP 907 capacity is modified by the request 1206 through the V-NFVO 1015. Furthermore, the shared SNI BP 1017 is reconfigured/modified in line with the H-NaaS LCM 1007 insights, e.g., received from NWDAF 919) in step 1210, e.g., reallocation of resource in the access network of the telecommunications system 915 of the second communications network 102, or scaling of capacity in network parts as needed, with use of additional pooled resources, or allocation of priority levels for the use of network resources for the network slice, priority level as e.g., different service classes, e.g., DiffSer IETF defined, on IP level or priority levels in radio access. At 1211, post-install, the H-NWS-LCM 1001 may interact directly with VNFs 910, and/or intra-slice management functions H-Domain manager 1011, to fully configure the network slice 903.

Steps 1201, 1202, 1204, 1205, 1206, 1209 and 1210 may be understood to be modified with respect to the corresponding actions in FIG. 11 in that the information received from the NWDAF node 919 is considered before going ahead with blue print with requested resources, dynamically, and not based on static templates.

As a simplified overview of the foregoing, embodiments herein may be understood to relate to a non manual flow to have optimized infrastructure be proactively requested and/or suggest to a VPLMN, and hence, the overall performance of the communications is improved with proactive planning and indications.

One advantage of embodiments herein is that the analysis may be able to utilize the existing HPLMN subscriber data and roaming pattern for the predictive analytics required for federated slicing dimensioning and the optimization of network resources. A further advantage of embodiments herein is that the roaming operator, with the help of real time optimized federated sliced network functions in 5G, will be better enabled to comply with any existing roaming SLA agreement with the home operator, and will therefore be enabled to provide the required service to the roaming subscribers, decreasing disruption in communications, latencies, and saving energy resources in the devices of the subscribers. Yet another advantage of embodiments herein is that the operator of the HPLMN may be in a position to perform dynamic changes to, and during specific time frames, define when the federated network slicing is required, and what performance, e.g., Quality of Service (QOS), throughput, number of subscribers, etc, may be required, of the slicing requirements with the roaming operator of the VPLMN, for the federated slice lifecycle.

Figure 13:
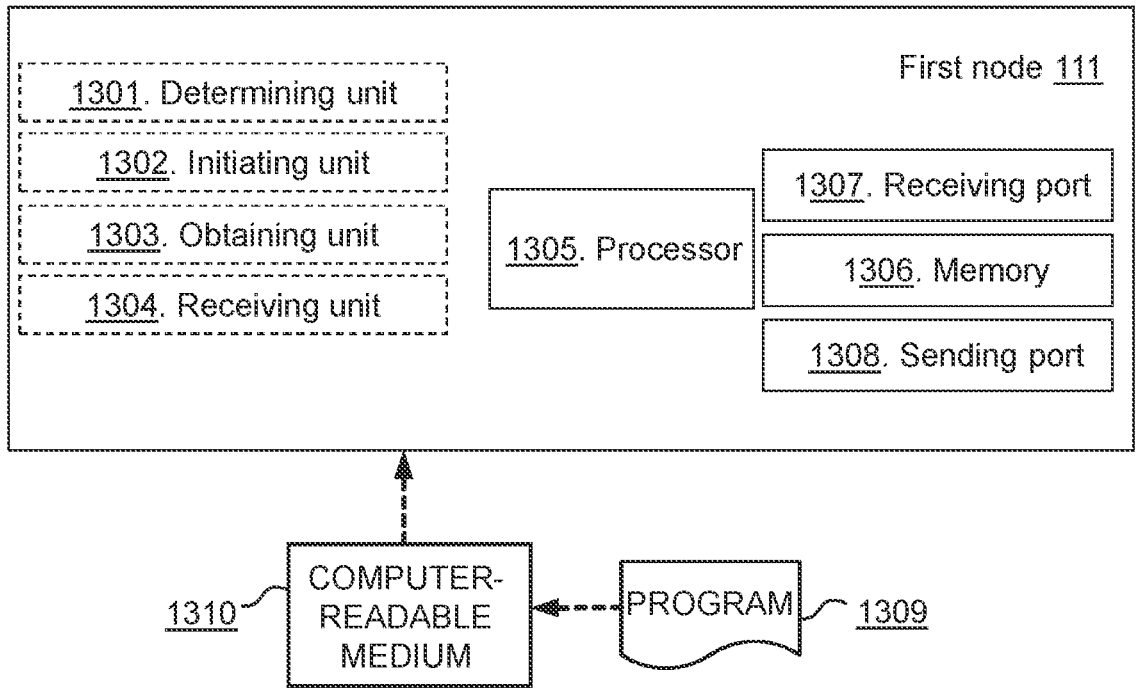
FIG. 13 is a schematic block diagram illustrating two non-limiting examples, a) and b), of a first node, according to embodiments herein.
Figure 13:
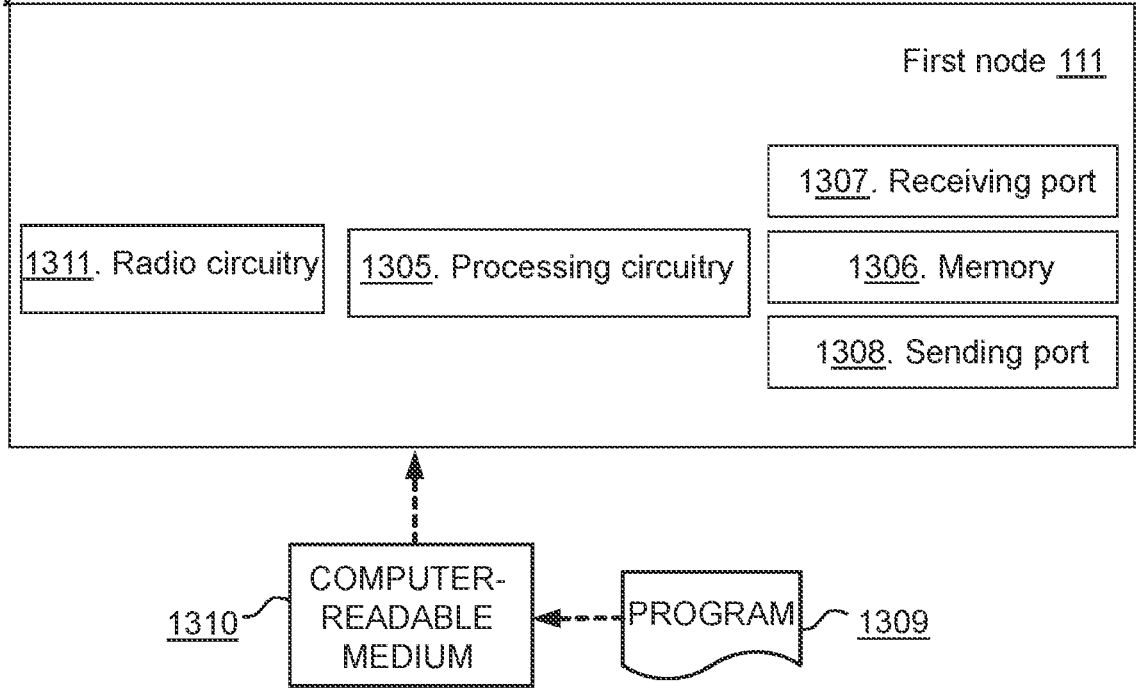

FIG. 13 depicts two different examples in panels a) and b), respectively, of the arrangement that the first node 111 may comprise to perform the method actions described above in relation to FIG. 2. In some embodiments, the first node 111 may comprise the following arrangement depicted in FIG. 13*a*. The first node 111 is configured to handle roaming information. The first node 111 is configured to operate in the first communications network 101.

Several embodiments are comprised herein. Components from one embodiment may be tacitly assumed to be present in another embodiment and it will be obvious to a person skilled in the art how those components may be used in the other exemplary embodiments. In FIG. 13, optional boxes are indicated by dashed lines. The detailed description of some of the following corresponds to the same references provided above, in relation to the actions described for the first node 111, and will thus not be repeated here. For example, the first communications network 101 may be configured to be a home 5G network, the second communications network 102 may be configured to be a visited 5G network, and the set of network resources predicted to be required may be to configured to be to instantiate a federated slice in the second communications network 102.

The first node 111 is configured to, e.g. by means of a determining unit 1301 within the first node 111 configured to, determine the set of network resources predicted to be required by the group of subscribers 151 of the first communications network 101 while roaming in the second communications network 102.

The first node 111 is also configured to, e.g. by means of an initiating unit 1302 within the first node 111 configured to, initiate providing the first indication of the set of network resources configured to be determined to the second node 112 configured to operate in the second communications network 102.

In some embodiments, the first node 111 may be configured to, e.g. by means of an obtaining unit 1303 within the first node 111 configured to, obtain, from the third node 113 configured to operate in the first communications network 101, the data regarding the roaming behavior of the group of subscribers 151 of the first communications network 101. The data may comprise one or more of: a) the first historical data on the roaming pattern in the second communications network 102 of the group of subscribers 151 during the first time period, b) the second historical data on the pattern of outgoing calls, by the group of subscribers 151, to the second communications network 102, c) the current data on users of the first communications network 101 configured to be roaming in the second communications network 102, the data being configured to be on the intended future use of the second communications network 102 during the second time period, d) the first data from the Uniform Locators configured to be visited by the group of subscribers 151, e) the second data from the Over the Top service providers configured to be used by the group of subscribers 151, and f) the third data on the roaming plans configured to be activated by the group of subscribers 151.

In some embodiments, to determine may be configured to be based on the information configured to be obtained.

In some embodiments, the first node 111 may be further configured to, e.g. by means of a receiving unit 1304 within the first node 111 configured to, receive the second indication from the second node 112. The second indication may be configured to indicate that the second node 112 is to refrain from allocating the set of network resources.

The embodiments herein may be implemented through one or more processors, such as a processor 1305 in the first node 111 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1306 comprising one or more memory units. The memory 1306 is arranged to be used to store obtained information, store data, configurations, schedulings, and applications etc. to perform the methods herein when being executed in the first node 111.

In some embodiments, the first node 111 may receive information from, e.g., the second node 112, and/or the third node 113, through a receiving port 1307. In some examples, the receiving port 1307 may be, for example, connected to one or more antennas in first node 111. In other embodiments, the first node 111 may receive information from another structure in the system of communications networks 100 through the receiving port 1307. Since the receiving port 1307 may be in communication with the processor 1305, the receiving port 1307 may then send the received information to the processor 1305. The receiving port 1307 may also be configured to receive other information.

The processor 1305 in the first node 111 may be further configured to transmit or send information to e.g., the second node 112, and/or the third node 113, through a sending port 1308, which may be in communication with the processor 1305, and the memory 1306.

Those skilled in the art will also appreciate that the determining unit 1301, the initiating unit 1302, the obtaining unit 1303, and the receiving unit 1304 described above may refer to a combination of analog and digital circuits, and/or one or more processors configured with software and/or firmware, e.g., stored in memory, that, when executed by the one or more processors such as the processor 1305, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the determining unit 1301, the initiating unit 1302, the obtaining unit 1303, and the receiving unit 1304 described above may be the processor 1305 of the first node 111, or an application running on such processor.

Thus, the methods according to the embodiments described herein for the first node 111 may be respectively implemented by means of a computer program 1309 product, comprising instructions, i.e., software code portions, which, when executed on at least one processor 1305, cause the at least one processor 1305 to carry out the actions described herein, as performed by the first node 111. The computer program 1309 product may be stored on a computer-readable storage medium 1310. The computer-readable storage medium 1310, having stored thereon the computer program 1309, may comprise instructions which, when executed on at least one processor 1305, cause the at least one processor 1305 to carry out the actions described herein, as performed by the first node 111. In some embodiments, the computer-readable storage medium 1310 may be a non-transitory computer-readable storage medium, such as a CD ROM disc, a memory stick, or stored in the cloud space. In other embodiments, the computer program 1309 product may be stored on a carrier containing the computer program, wherein the carrier is one of an electronic signal, optical signal, radio signal, or the computer-readable storage medium 1310, as described above.

The first node 111 may comprise an interface unit to facilitate communications between the first node 111 and other nodes or devices, e.g., the second node 112, and/or the third node 113. In some particular examples, the interface may, for example, include a transceiver configured to transmit and receive radio signals over an air interface in accordance with a suitable standard.

In other embodiments, the first node 111 may comprise the following arrangement depicted in FIG. 13b. The first node 111 may comprise a processing circuitry 1305, e.g., one or more processors such as the processor 1305, in the first node 111 and the memory 1306. The first node 111 may also comprise a radio circuitry 1311, which may comprise e.g., the receiving port 1307 and the sending port 1308. The processing circuitry 1305 may be configured to, or operable to, perform the method actions according to FIG. 2, in a similar manner as that described in relation to FIG. 13a. The radio circuitry 1311 may be configured to set up and maintain at least a wireless connection with the second node 112, and/or the third node 113. Circuitry may be understood herein as a hardware component.

Hence, embodiments herein also relate to the first node 111 operative to handle roaming information, the first node 111 being operative to operate in the first communications network 101. The first node 111 may comprise the processing circuitry 1305 and the memory 1306, said memory 1306 containing instructions executable by said processing circuitry 1305, whereby the first node 111 is further operative to perform the actions described herein in relation to the first node 111, e.g., in FIG. 2.

Figure 14:
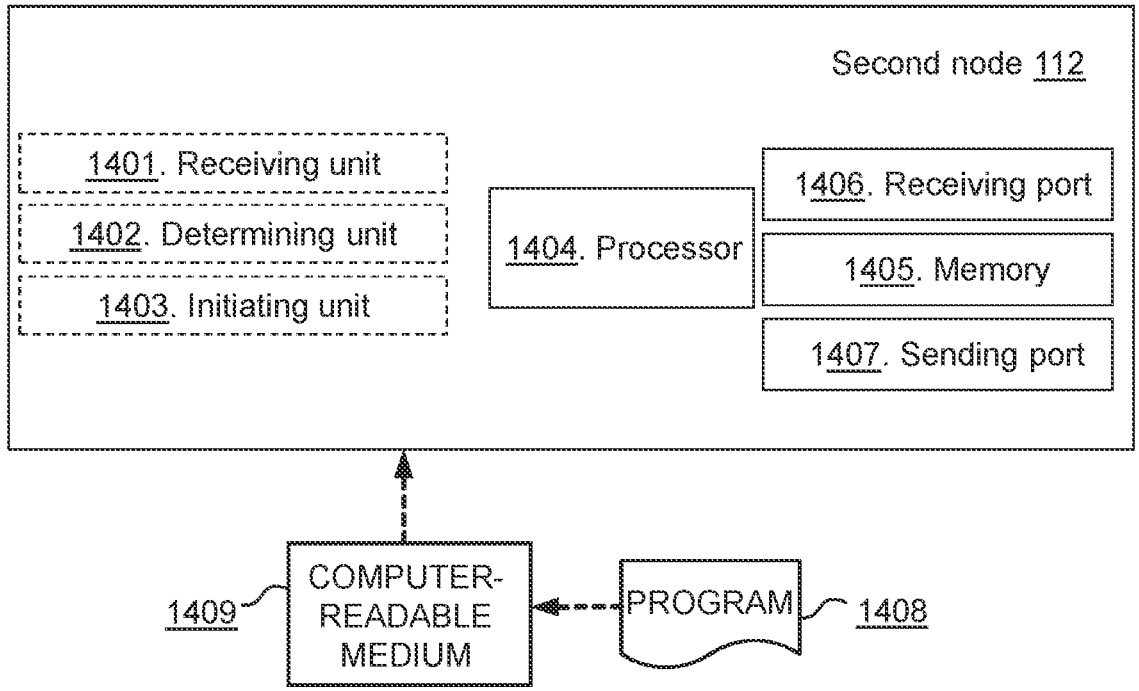
FIG. 14 is a schematic block diagram illustrating two non-limiting examples, a) and b), of a second node, according to embodiments herein.
Figure 14:
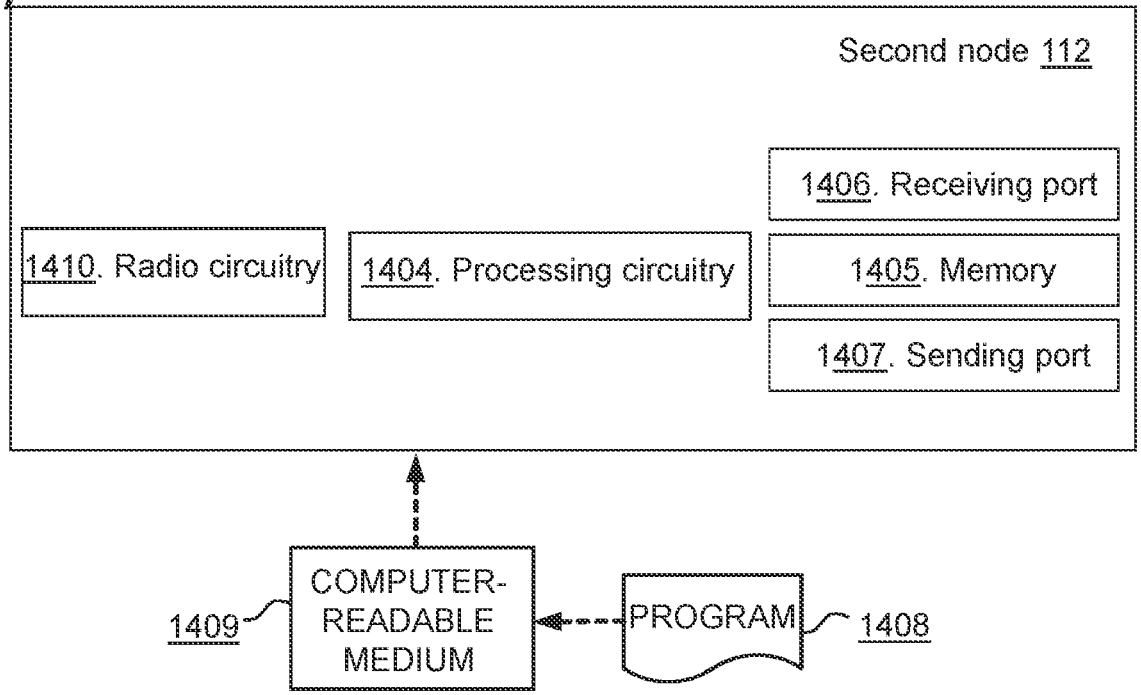

FIG. 14 depicts two different examples in panels a) and b), respectively, of the arrangement that the second node 112 may comprise to perform the method actions described above in relation to FIG. 3. In some embodiments, the second node 112 may comprise the following arrangement depicted in FIG. 14a. The second node 112 is configured to handle roaming information. The second node 112 is configured to operate in the second communications network 102.

Several embodiments are comprised herein. Components from one embodiment may be tacitly assumed to be present in another embodiment and it will be obvious to a person skilled in the art how those components may be used in the other exemplary embodiments. In FIG. 14, optional boxes are indicated by dashed lines. The detailed description of some of the following corresponds to the same references provided above, in relation to the actions described for the second node 112, and will thus not be repeated here. For example, the first communications network 101 may be configured to be a home 5G network, the second communications network 102 may be configured to be a visited 5G network, and the set of network resources predicted to be required may be to configured to be to instantiate a federated slice in the second communications network 102.

The second node 112 is configured to, e.g. by means of a receiving unit 1401 within the second node 112 configured to, receive, from the first node 111 configured to operate in the first communications network 101, the first indication of the set of network resources predicted to be required by the group of subscribers 151 of the first communications network 101 while roaming in the second communications network 102.

The second node 112 is also configured to, e.g. by means of a determining unit 1402 within the second node 112 configured to, determine whether or not the allocation of the set of network resources for use by the group of subscribers 151 meets the allocation criterion.

In some embodiments, the second node 112 may be configured to, e.g. by means of an initiating unit 1403 within the second node 112 configured to, initiate performing the operation based on the result of the determination. The operation is configured to be selected out of: a) allocating the set of network resources for use by the group of subscribers 151 with the proviso the that criterion is met, and b) sending the second indication to the first node 111, with the proviso the that criterion is not met. The second indication is configured to indicate that the second node 112 is to refrain from allocating the set of network resources.

The embodiments herein may be implemented through one or more processors, such as a processor 1404 in the second node 112 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1405 comprising one or more memory units. The memory 1405 is arranged to be used to store obtained information, store data, configurations, schedulings, and applications etc. to perform the methods herein when being executed in the second node 112.

In some embodiments, the second node 112 may receive information from, e.g., the first node 111, and/or the third node 113, through a receiving port 1406. In some examples, the receiving port 1406 may be, for example, connected to one or more antennas in second node 112. In other embodiments, the second node 112 may receive information from another structure in the system of communications networks 100 through the receiving port 1406. Since the receiving port 1406 may be in communication with the processor 1404, the receiving port 1406 may then send the received information to the processor 1404. The receiving port 1406 may also be configured to receive other information.

The processor 1404 in the second node 112 may be further configured to transmit or send information to e.g., the first node 111, and/or the third node 113, through a sending port 1407, which may be in communication with the processor 1404, and the memory 1405.

Those skilled in the art will also appreciate that the receiving unit 1401, the determining unit 1402, and/or the initiating unit 1403 described above may refer to a combination of analog and digital circuits, and/or one or more processors configured with software and/or firmware, e.g., stored in memory, that, when executed by the one or more processors such as the processor 1404, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the receiving unit 1401, the determining unit 1402, the initiating unit 1403, and the receiving unit 1404 described above may be the processor 1404 of the second node 112, or an application running on such processor.

Thus, the methods according to the embodiments described herein for the second node 112 may be respectively implemented by means of a computer program 1408 product, comprising instructions, i.e., software code portions, which, when executed on at least one processor 1404, cause the at least one processor 1404 to carry out the actions described herein, as performed by the second node 112. The computer program 1408 product may be stored on a computer-readable storage medium 1409. The computer-readable storage medium 1409, having stored thereon the computer program 1408, may comprise instructions which, when executed on at least one processor 1404, cause the at least one processor 1404 to carry out the actions described herein, as performed by the second node 112. In some embodiments, the computer-readable storage medium 1409 may be a non-transitory computer-readable storage medium, such as a CD ROM disc, a memory stick, or stored in the cloud space. In other embodiments, the computer program 1408 product may be stored on a carrier containing the computer program, wherein the carrier is one of an electronic signal, optical signal, radio signal, or the computer-readable storage medium 1409, as described above.

The second node 112 may comprise an interface unit to facilitate communications between the second node 112 and other nodes or devices, e.g., the first node 111, and/or the third node 113. In some particular examples, the interface may, for example, include a transceiver configured to transmit and receive radio signals over an air interface in accordance with a suitable standard.

In other embodiments, the second node 112 may comprise the following arrangement depicted in FIG. 14b. The second node 112 may comprise a processing circuitry 1404, e.g., one or more processors such as the processor 1404, in the second node 112 and the memory 1405. The second node 112 may also comprise a radio circuitry 1410, which may comprise e.g., the receiving port 1406 and the sending port 1407. The processing circuitry 1404 may be configured to, or operable to, perform the method actions according to FIG. 3, in a similar manner as that described in relation to FIG. 14a. The radio circuitry 1410 may be configured to set up and maintain at least a wireless connection with the first node 111, and/or the third node 113. Circuitry may be understood herein as a hardware component.

Hence, embodiments herein also relate to the second node 112 operative to handle roaming information, the second node 112 being operative to operate in the second communications network 102. The second node 112 may comprise the processing circuitry 1404 and the memory 1405, said memory 1405 containing instructions executable by said processing circuitry 1404, whereby the second node 112 is further operative to perform the actions described herein in relation to the second node 112, e.g., in FIG. 3.

Figure 4:
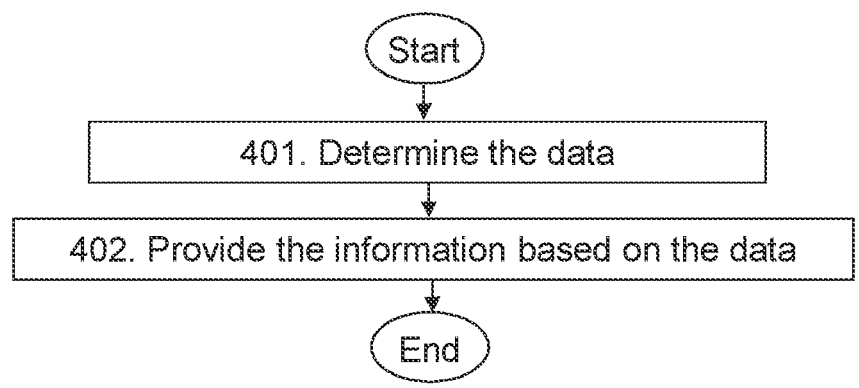
FIG. 4 is a flowchart depicting embodiments of a method in a third node, according to embodiments herein.
Figure 15:
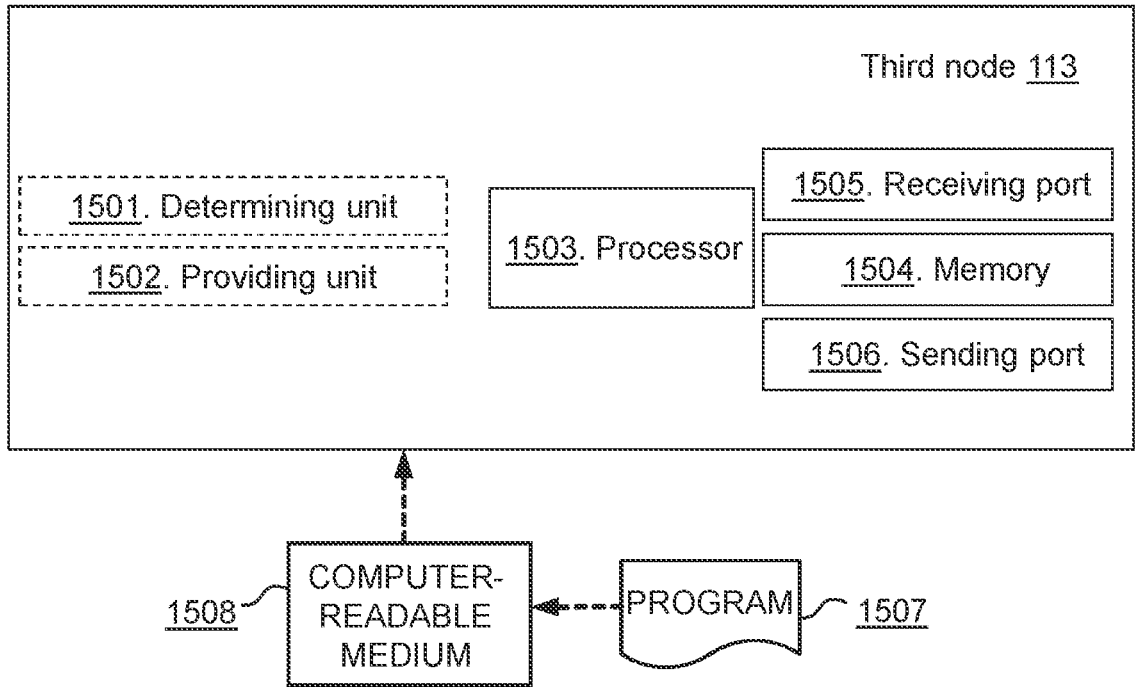
FIG. 15 is a schematic block diagram illustrating two non-limiting examples, a) and b), of a third node, according to embodiments herein.
Figure 15:
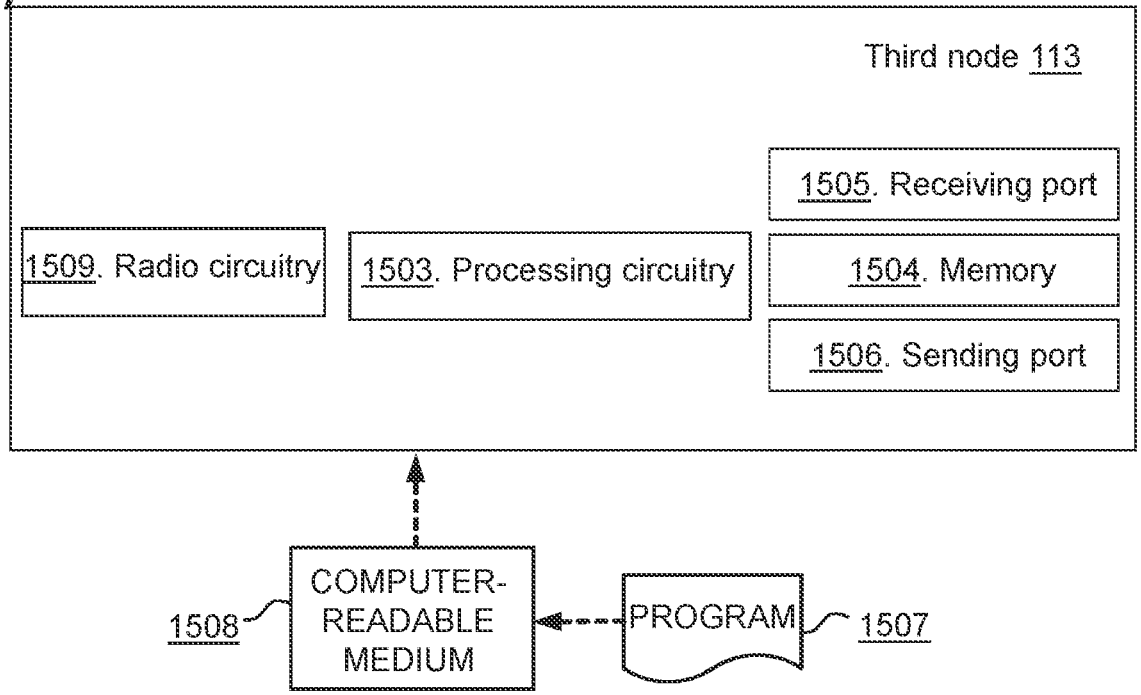

FIG. 15 depicts two different examples in panels a) and b), respectively, of the arrangement that the third node 113 may comprise to perform the method actions described above in relation to FIG. 4. In some embodiments, the third node 113 may comprise the following arrangement depicted in FIG. 15a. The third node 113 is configured to handle roaming information. The third node 113 is configured to operate in in one of: the first communications network 101, and the second communications network 102.

Several embodiments are comprised herein. Components from one embodiment may be tacitly assumed to be present in another embodiment and it will be obvious to a person skilled in the art how those components may be used in the other exemplary embodiments. In FIG. 15, optional boxes are indicated by dashed lines. The detailed description of some of the following corresponds to the same references provided above, in relation to the actions described for the third node 113, and will thus not be repeated here. For example, the first communications network 101 may be configured to be a home 5G network, the second communications network 102 may be configured to be a visited 5G network, and the set of network resources predicted to be required may be to configured to be to instantiate a federated slice in the second communications network 102.

The third node 113 is configured to, e.g. by means of a determining unit 1501 within the third node 113 configured to, determine the data regarding the roaming behavior of the group of subscribers 151 of the first communications network 101. The data may comprise at least one of: a) the first historical data on the roaming pattern in the second communications network 102 of the group of subscribers 151 during the first time period, b) the second historical data on the pattern of outgoing calls, by the group of subscribers 151, to the second communications network 102, c) the current data on the users of the first communications network 101 configured to be roaming in the second communications network 102, the data being configured to be on the intended future use of the second communications network 102 during the second time period, d) the first data from the Uniform Locators configured to be visited by the group of subscribers 151, f) the second data from the Over the Top service providers configured to be used by the group of subscribers 151, and/or g) the third data on the roaming plans configured to be activated by the group of subscribers 151.

The third node 113 is also configured to, e.g. by means of a providing unit 1502 within the third node 113 configured to, provide the information based on the data configured to be determined, to the first node 111 configured to be operating in the first communications network 101.

In some embodiments, the third node 113 may be configured to be the fourth node 114. In such embodiments, the data may be configured to be the first historical data on the roaming pattern, and the information may be configured to be the first information based on the first historical data.

In some embodiments, the third node 113 may be configured to be the fifth node 115. In such embodiments, the data may be configured to be the second historical data on the pattern of outgoing calls, and the information may be configured to be the second information based on the second historical data.

In some embodiments, the third node 113 may be the sixth node 116 in the first communications network 101. In such embodiments, the data may be configured to be the current data on the users of the first communications network 101, and the information may be configured to be the third information based on the current data.

In some embodiments, the third node 113 may be configured to be the seventh node 117. In such embodiments, the data may be configured to be the first data from the Uniform Locators visited by the group of subscribers 151, and the information may be configured to be the fourth information based on the first data.

In some embodiments, the third node 113 may be configured to be the eighth node 118. In such embodiments, the data may be configured to be the second data from the Over the Top service providers configured to be used by the group of subscribers 151, and the information may be configured to be the fifth information based on the second data.

In some embodiments, the third node 113 may be configured to be the ninth node 119. In such embodiments, the data may be the third data on the roaming plans configured to be activated by the group of subscribers 151, and the information may be configured to be the sixth information based on the third data.

The embodiments herein may be implemented through one or more processors, such as a processor 1503 in the third node 113 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the third node 113. One such carrier may be in the form of a CD ROM disc. It is however feasible with other data carriers such as a memory stick. The computer program code may furthermore be provided as pure program code on a server and downloaded to the third node 113.

The third node 113 may further comprise a memory 1504 comprising one or more memory units. The memory 1504 is arranged to be used to store obtained information, store data, configurations, schedulings, and applications etc. to perform the methods herein when being executed in the third node 113.

In some embodiments, the third node 113 may receive information from, e.g., the first node 111, and/or the second node 112, through a receiving port 1505. In some examples, the receiving port 1505 may be, for example, connected to one or more antennas in third node 113. In other embodiments, the third node 113 may receive information from another structure in the system of communications networks 100 through the receiving port 1505. Since the receiving port 1505 may be in communication with the processor 1503, the receiving port 1505 may then send the received information to the processor 1503. The receiving port 1505 may also be configured to receive other information.

The processor 1503 in the third node 113 may be further configured to transmit or send information to e.g., the first node 111, and/or the second node 112, through a sending port 1506, which may be in communication with the processor 1503, and the memory 1504.

Those skilled in the art will also appreciate that the determining unit 1501, and/or the providing unit 1502 described above may refer to a combination of analog and digital circuits, and/or one or more processors configured with software and/or firmware, e.g., stored in memory, that, when executed by the one or more processors such as the processor 1503, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the determining unit 1501 and the providing unit 1502 described above may be the processor 1503 of the third node 113, or an application running on such processor.

Thus, the methods according to the embodiments described herein for the third node 113 may be respectively implemented by means of a computer program 1507 product, comprising instructions, i.e., software code portions, which, when executed on at least one processor 1503, cause the at least one processor 1503 to carry out the actions described herein, as performed by the third node 113. The computer program 1507 product may be stored on a computer-readable storage medium 1508. The computer-readable storage medium 1508, having stored thereon the computer program 1507, may comprise instructions which, when executed on at least one processor 1503, cause the at least one processor 1503 to carry out the actions described herein, as performed by the third node 113. In some embodiments, the computer-readable storage medium 1508 may be a non-transitory computer-readable storage medium, such as a CD ROM disc, a memory stick, or stored in the cloud space. In other embodiments, the computer program 1507 product may be stored on a carrier containing the computer program, wherein the carrier is one of an electronic signal, optical signal, radio signal, or the computer-readable storage medium 1508, as described above.

The third node 113 may comprise an interface unit to facilitate communications between the third node 113 and other nodes or devices, e.g., the first node 111, and/or the second node 112. In some particular examples, the interface may, for example, include a transceiver configured to transmit and receive radio signals over an air interface in accordance with a suitable standard.

In other embodiments, the third node 113 may comprise the following arrangement depicted in FIG. 15b. The third node 113 may comprise a processing circuitry 1503, e.g., one or more processors such as the processor 1503, in the third node 113 and the memory 1504. The third node 113 may also comprise a radio circuitry 1509, which may comprise e.g., the receiving port 1505 and the sending port 1506. The processing circuitry 1503 may be configured to, or operable to, perform the method actions according to FIG.

4, in a similar manner as that described in relation to FIG. 15a. The radio circuitry 1509 may be configured to set up and maintain at least a wireless connection with the first node 111, and/or the second node 112. Circuitry may be understood herein as a hardware component.

Hence, embodiments herein also relate to the third node 113 operative to handle roaming information, the third node 113 being operative to operate in in one of: the first communications network 101, and the second communications network 102. The third node 113 may comprise the processing circuitry 1503 and the memory 1504, said memory 1504 containing instructions executable by said processing circuitry 1503, whereby the third node 113 is further operative to perform the actions described herein in relation to the third node 113, e.g., in FIG. 4.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method, performed by a second node, for handling roaming information, the second node operating in a second communications network, the method comprising:

receiving, from a first node operating in a first communications network, a first indication of a set of network resources predicted to be required by a group of subscribers of the first communications network while roaming in the second communications network, determining whether or not an allocation of the set of network resources for use by the group of subscribers meets an allocation criterion, and initiating performing an operation based on a result of the determination, the operation being selected out of:

a) allocating the set of network resources for use by the group of subscribers with the proviso that the criterion is met, and b) sending a second indication to the first node, with the proviso that the criterion is not met, the second indication indicating that the second node is to refrain from allocating the set of network resources.

2. The method according to claim 1, wherein the first communications network is a home Fifth Generation, 5G, network, the second communications network is a visited 5G network, and the set of network resources predicted to be required is to instantiate a federated slice in the second communications network.

3. The method of claim 2, wherein the third node is a fourth node, and wherein:

the data is the first historical data on the roaming pattern, and the information is first information based on the first historical data.

4. The method of claim 2, wherein the third node is a fifth node, wherein:

the data is the second historical data on a pattern of outgoing calls, and the information is second information based on the second historical data.

5. The method of claim 2, wherein the third node is a sixth node in the first communications network, and wherein:

the data is the current data on the users of the first communications network, and the information is third information based on the current data.

6. The method of claim 2, wherein the third node is a seventh node, and wherein:

the data is the first data from Uniform Locators visited by the group of subscribers, and the information is fourth information based on the first data.

7. The method of claim 2, wherein the third node is an eighth node, and wherein:

the data is the second data from Over the Top service providers used by the group of subscribers, and the information is fifth information based on the second data.

8. The method of claim 2, wherein the third node is a ninth node, and wherein:

the data is the third data on roaming plans activated by the group of subscribers, and the information is sixth information based on the third data.

* * * * *